United States Patent
Siegel et al.

(10) Patent No.: US 10,878,380 B2
(45) Date of Patent: *Dec. 29, 2020

(54) METHOD AND APPARATUS FOR MOBILE QUALITY MANAGEMENT INSPECTIONS

(71) Applicant: Lifetime Brands, Inc., Garden City, NY (US)

(72) Inventors: Clifford Siegel, Centerport, NY (US); Matthew Kamenstein, Huntington, NY (US); Christine Thatner, Patchogue, NY (US)

(73) Assignee: Lifetime Brands, Inc., Garden City, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/894,024

(22) Filed: Jun. 5, 2020

(65) Prior Publication Data
US 2020/0320480 A1   Oct. 8, 2020

Related U.S. Application Data

(63) Continuation of application No. 16/051,545, filed on Aug. 1, 2018, which is a continuation of application No. 14/778,211, filed as application No. PCT/US2014/031223 on Mar. 19, 2014, now Pat. No. 10,127,523.

(60) Provisional application No. 61/803,501, filed on Mar. 20, 2013.

(51) Int. Cl.
*G06Q 10/10* (2012.01)
*G06Q 10/06* (2012.01)
*H04W 8/18* (2009.01)

(52) U.S. Cl.
CPC ....... *G06Q 10/10* (2013.01); *G06Q 10/06311* (2013.01); *H04W 8/18* (2013.01)

(58) Field of Classification Search
CPC .... G06Q 10/10; G06Q 10/06311; H04W 8/18
See application file for complete search history.

(56) References Cited

U.S. PATENT DOCUMENTS

| 6,300,147 B1 * | 10/2001 | Naruoka | H01L 22/24 257/E21.527 |
| 2003/0069716 A1 * | 4/2003 | Martinez | G06Q 10/06 702/188 |
| 2005/0211777 A1 * | 9/2005 | Wetzel | G07C 3/14 235/385 |

(Continued)

OTHER PUBLICATIONS

List of Patents or Patent Applications Treated as Related dated Jun. 5, 2020, 14 pages.

*Primary Examiner* — Sujay Koneru
(74) *Attorney, Agent, or Firm* — Tutunjian & Bitetto, P.C.

(57) ABSTRACT

A mobile Quality Management/Control system for performing mobile product inspections is provided. A mobile device, such as a tablet, is configured to communicate with one or more databases and allow for real time entry (and subsequent access) of the details of product inspections for quality control and management purposes. The details of such inspections are maintained and available for all subsequent inspections. The mobile device is further configured to provide inspectors with inspection procedures and/or tutorials associated with the inspections being performed.

7 Claims, 42 Drawing Sheets

(56) References Cited

U.S. PATENT DOCUMENTS

| | | | | |
|---|---|---|---|---|
| 2005/0267964 A1* | 12/2005 | Kech | G06F 8/65 | 709/223 |
| 2006/0174719 A1* | 8/2006 | Carter | G01M 5/0075 | 73/865.9 |
| 2006/0235560 A1* | 10/2006 | Ogawa | H01L 21/67253 | 700/109 |
| 2007/0043811 A1* | 2/2007 | Kim | G06Q 10/06 | 709/203 |
| 2007/0127807 A1* | 6/2007 | Koshikawa | G06K 9/00 | 382/149 |
| 2008/0123934 A1* | 5/2008 | Amidi | G05B 23/0229 | 382/141 |
| 2008/0163140 A1* | 7/2008 | Fouquet | G03F 1/84 | 700/110 |
| 2009/0200378 A1* | 8/2009 | Doherty | G06F 1/1684 | 235/462.01 |
| 2009/0257555 A1* | 10/2009 | Chalmers | G01N 23/20 | 378/57 |
| 2010/0049574 A1* | 2/2010 | Paul | G06Q 50/04 | 705/7.25 |
| 2010/0070318 A1* | 3/2010 | Clemens | G06Q 50/28 | 705/28 |
| 2010/0185549 A1* | 7/2010 | York | G06Q 10/087 | 705/301 |
| 2010/0302375 A1* | 12/2010 | Terayoko | G06Q 10/06 | 348/158 |
| 2012/0095585 A1* | 4/2012 | Agarwal | G06Q 10/06 | 700/109 |
| 2012/0236720 A1* | 9/2012 | Dominguez Romero | H04N 21/23805 | 370/235 |
| 2013/0151428 A1* | 6/2013 | Hesse | G06Q 10/0639 | 705/318 |
| 2013/0231769 A1* | 9/2013 | Tien | G06T 7/001 | 700/121 |
| 2013/0262192 A1* | 10/2013 | McCarty | G06Q 10/06395 | 705/7.41 |
| 2014/0149252 A1* | 5/2014 | Rabenold | G06Q 40/04 | 705/26.35 |
| 2016/0283904 A1* | 9/2016 | Siegel | H04W 8/18 | |

\* cited by examiner

Inspections — Sync Complete — Pending Upload: 0

SORT BY: Start Date | SCAN

| Start Date | Factory | Lot/PO | End Date |
|---|---|---|---|
| Feb 26, 2013 | Tianjin Thl Tableware Co Ltd<br>Jinnan District | 700 000 04656 | Feb 26, 2013 |
| Mar 7, 2013 | Mei Li Nuo Nanjing Household<br>Nanjing City, Jiangsu Province | 58399<br>450 003 8201 | Mar 15, 2013 |
| Mar 8, 2013 | Taeyang Hanoi Co Ltd<br>Kim Dong District, Hung Yen Province | 58403<br>450 009 5109 | Mar 9, 2013 |
| Mar 15, 2013 | J & M Ceramics Industrial Co Ltd<br>Fengxin, Chaozou City | 58427<br>450 008 9349 | Mar 18, 2013 |

Source Inspection — Lot# 58427

- Vendor: GREAT FOCUS (HK) LTD.
- Factory: J & M CERAMICS INDUSTRIAL CO LTD
- Address: XIBIAN TIANZHONG DISTRICT
- Address2:
- City: FENGXIN, CAOZHOUN CITY
- Postal Code: 521000
- Country: CHINA Contact / Phone / Email — MAP Material: 5099396
Description: MKSA ATQ CNTRSD FIG 8.5 IN SLD PLT
Tools Required: TAPE MEASURE, WEIGHT SCALE (V)

| 1440 | 125 | 12 | 11 |
|---|---|---|---|
| Lot Qty | Eaches<br>Sample Qty | Lot MP Qty | Sample MP Qty |

Previous Inspections | Summary | View

| Mar 15, 2013 | Jiangsu Gaochun Ceramics Co. Ltd<br>Goachun County, Nanjing | 58428<br>450 009 1103 | Mar 18, 2013 |

| Sync | Sync Complete | Inspections | Pending Upload: 0 | ⚙ |

SORT BY: Start Date | 🔍 | SCAN 📷

| Start Date | Factory | Lot/PO | End Date |
|---|---|---|---|
| Feb 26, 2013 | Tianjin Thl Tableware Co Ltd<br>Jinnan District | 700 000 04656 | Feb 26, 2013 |
| Mar 7, 2013 | Mei Li Nuo Nanjing Household<br>Nanjing City, Jiangsu Province | 58399<br>450 003 8201 | Mar 15, 2013 |
| Mar 8, 2013 | Taeyang Hanoi Co Ltd<br>Kim Dong District, Hung Yen Province | 58403<br>450 009 5109 | Mar 9, 2013 |
| Mar 15, 2013 | J & M Ceramics Industrial Co Ltd<br>Fengxin, Chaozou City | 58427<br>450 008 9349 | Mar 18, 2013 |

Source Inspection      Lot# 58427

| | |
|---|---|
| Vendor | GREAT FOCUS (HK) LTD. |
| Factory | J & M CERAMICS INDUSTRIAL CO LTD |
| Address | XIBIAN TIANZHONG DISTRICT |
| Address2 | |
| City | FENGXIN, CAOZHOUN CITY |
| Postal Code | 521000 |
| Country | CHINA |

Contact
Phone
Email ( MAP 🌐 )

Material 5099396
Description MKSA ATQ CNTRSD FIG 8.5 IN SLD PLT    1440    125    12    11
                                                                             Eaches
Tools Required TAPE MEASURE, WEIGHT SCALE (V)   Lot Qty   Sample Qty   Lot MP Qty   Sample MP Qty

| Previous Inspections | Summary 📊 | | View |

| Mar 15, 2013 | Jiangsu Gaochun Ceramics Co. Ltd<br>Goachun County, Nanjing | 58428<br>450 009 1103 | Mar 18, 2013 |

208

210

Previous Inspections | Back

Feb 26, 2013　TIANJIN THL TABLEWARE CO LTD　　7000004656　　Mail ✉

| Operation # | Description | | Open |
|---|---|---|---|

0150　　FACTORY TOUR - HEALTH - SAFETY

0010 — 1 Samples

Does the factory have a function-running time clock/time keeping system and use it currently, also have a battery backup?　　NO　1 Found

| Defect | Location | # Found |
|---|---|---|
| 02/12/13　No Time Clock | | 1 |
| 02/14/13　Time Clock Not Used | | 1 |

0020 — 1 Samples

Are the retailer guidelines posted, also clearly visible to majority of the employees and in a language the emplyees will understand?　　NO　1 Found

| Defect | Location | # Found |
|---|---|---|
| 02/14/13　Not posted | | 1234... |

0030 — 1 Samples

Does the factory have any rules for employees?　　NO　0 Found

0060 — 1 Samples

Do you see an evacuation plan posted on each floor of the factory?　　NO　0 Found

0080 — 1 Samples

Are there any fire extinguishewrs, hoses or hydrants in the factory?　　NO　0 Found

0160 — 1 Samples

Are the fire extinguishers placed at an appropriate height to be used by all employees?　　NO　0 Found

0170 — 1 Samples

Is the quality of the ventilation in the factory acceptable?　　NO　0 Found

FIG. 10G

| | |
|---|---|
| Cancel | Draft Results for LOT:070000004656 | Send |

To:

Cc/Bcc, From: matthyew.kamenstein@lifetimebrands.com

Subject: Draft Results for LOT:070000004656

| Draft Audit inspection for a vendor | Lot# 070000004656 |
|---|---|

| | |
|---|---|
| Vendor | TIANJIN THL TABLEWARE CO. LTD. |
| Factory | TIANJIN THL TABLEWARE CO LTD |
| Address | JIUDAOGOU, GEGU TOWN |
| City | JINNAN DISTRICT |
| Postal Code | |
| Country | China |

Operation 0150 — FACTORY TOUR - HEALTH - SAFETY

| #0010 1 Samples | Does the factory have a function-running time clock/time keeping system and use it currently, also have a battery backup? | | NO 1 Found |
|---|---|---|---|

| Defect | Location | # Found | |
|---|---|---|---|
| 02/12/13 No Time Clock | | 1 | |
| 02/14/13 Time Clock Not Used | | 1 | |

| #0020 1 Samples | Are the retailer guidelines posted, also clearly visible to majority of the employees and in a language the emplyees will understand? | | NO 1 Found |
|---|---|---|---|

| Defect | Location | # Found | |
|---|---|---|---|
| 02/14/13 Not posted | | 1234... | |

| #0030 1 Samples | Does the factory have any rules for employees? | | NO 0 Found |
|---|---|---|---|

| #0060 1 | Do you see an evacuation plan posted on each floor of the factory? | | NO |
|---|---|---|---|

Inspection Summary — 210

March 7, 2013  FW PRO SS SLOTTED TURNER    58399    Mail ✉
                                            4500038201

Test 123|

| Operation # | Description | | Open |
|---|---|---|---|
| 0500 | Product | 14 | 6 |

0010 — 1 Samples

Is there any evidence of surface degradation, including crazing, shivering, denting, bubbles, cracks, stains, deformations, chips, fractures, heavy lines, waves, shear marks, scratches, scuff marks, identtaions or blisters NO — 15 Found

| Defect | Location | # Found | |
|---|---|---|---|
| Blurry | | 15 | |
| Burnt Areas | | 1 | |
| Dents | | 1 | |

FIG. 10J

Draft Results for LOT:000000058399

To:

Cc/Bcc, From: matthyew.kamenstein@lifetimebrands.com

Subject: Draft Results for LOT:000000058399

Draft Source Inspection      Lot# 000000058399

- Vendor: MERRY-HOME MANUFACTURING LTD
- Factory: MEI LI NUO NANJING HOUSEHOLD
- Address: NO. 10 HUASHANG ROAD
- City: NANJING CITY, JIANGSU PROVINCE
- Postal Code:
- Country: CHINA
- Material: 5084423
- Desc: FW PRO SS SLOTTED TURNER
- PO Number: 4500038

Operation 0500 — Product

0020 — 50 Samples — Is there any evidence of surface degradation, including crazing, shivering, denting, bubbles, cracks, stains, deformations, chips, fractures, heavy lines, waves, shear marks, scratches, scuff marks, identations or blisters, over polishing — NO Result — 15 Found

| Defect | Location | Quantity |
| --- | --- | --- |
| Blurry | | 15 |
| Burnt Areas | | 1 |

Test

Dents

FIG. 10K

Results Recording

Short Text
Long Text

Specification

Sample Size

Method - DOC Mgmt Ink

Factory Info

Barcode validation (if applicable)

Results field

Submit

FIG. 13A

Inspection Criteria

Dimensions

Color

Handle

Pull Test

Operations Overview

Back

March 7, 2013 | 5084423 FW PRO SS SLOTTED TURNER | 58399 450 003 8201 | March 15, 2013 | START INSPECTION

| Operation # | Description | | Required | Open |
|---|---|---|---|---|
| 0500 | Product | | 14 | 14 |

| | # | Description | | Yes or No (No = Reject) |
|---|---|---|---|---|
| | #0010 50 Samples | Are there gaps in the seams of the component? There must be No measurable space, openings or separation for food to enter. | 📷 ✏️ | Yes / No |
| | #0020 50 Samples | Is there any evidence of surface degradation, including craving, shivering, denting, bubbles, cracks, stains, deformations, chips, fractures, heavy lines, waves, shear marks ⌄ | 📷 ✏️ | Yes / No |
| | #0030 50 Samples | Does finish/plating match approved sample? | 📷 ✏️ | Yes / No |
| | #0040 50 Samples | Is the overall cleanliness acceptable? - look for grease marks, dirty mark, dust, etc. | 📷 ✏️ | Yes / No |
| | #0050 50 Samples | Do all samples look the same and match approved sample? | 📷 ✏️ | Results |
| | #0060 5 Samples | Does the handle withstand 10lb pull force? Does a pull test end cap of the handle to withstand 10lb pull force? | 📷 ✏️ | Results |
| | #0070 5 Samples | Is the handle secure and able to withstand 25lb pull force? | 📷 ✏️ | Yes / No |
| | #0080 5 | Do dimensions and weight match approved gold sample? | 📷 ✏️ | Results |

FIG. 13B.1

Operations Overview

March 7, 2013 — 5084423 FW PRO SS SLOTTED TURNER — 58399 450 003 8201 — March 15, 2013 — IN PROGRESS

| Operation # | Description | | Required | Open |
|---|---|---|---|---|
| 0500 | Product | | 14 | 10 |

- #0010 — 50 Samples — Are there gaps in the seams of the component? There must be No measurable space, openings or separation for food to enter. — Yes or No (No = Reject) — Yes | No
- #0020 — 50 Samples — Is there any evidence of surface degradation, including craving, shivering, denting, bubbles, cracks, stains, deformations, chips, fractures, heavy lines, waves, shear marks — Yes or No (No = Reject) — Yes | No
- #0030 — 50 Samples — Does finish/plating match approved sample? — Yes or No (No = Reject) — Yes | No
- #0040 — 50 Samples — Is the overall [...] for grease ma[...] — Yes or No (No = Reject) — Yes | No
- #0050 — 50 Samples — Do all sample[...] approved sam[...] — Yes or No (N = Reject) — Results
- #0060 — 5 Samples — Does the han[...] Does a pull te[...] withstand 10l[...] — Yes or No (N = Reject) — Results
- #0070 — 5 Samples — Is the handle [...] 25lb pull force? — Yes or No (No = Reject) — Yes | No
- #0080 — 5 [Samples] — Do dimensions and weight match approved gold sample? — Yes or No (No = Reject) — Results

Qualitative Result Recording

Result Recording

- YES
- NO
- N/A

FIG. 13B.2

| Back | Operations Overview | | | | |
|---|---|---|---|---|---|
| March 7, 2013 | 5084423 FW PRO SS SLOTTED TURNER | 58399 450 003 8201 | March 15, 2013 | IN PROGRESS | |

| Operation # | Description | | Required | Open |
|---|---|---|---|---|
| 0500 | Product | | 14 | 6 |

| | # | Samples | Description | | | Response |
|---|---|---|---|---|---|---|
| 💡 | #0010 | 50 Samples | Are there gaps in the seams of the component? There must be No measurable space, openings or separation for food to enter. | 📷 | ✏️ | Yes or No (No = Reject) — Yes / No |
| 💡 | #0020 | 50 Samples | Is there any evidence of surface degradation, including craving, shivering, denting, bubbles, cracks, stains, deformations, chips, fractures, heavy lines, waves, shear marks ⌄ | 📷 | ✏️ | Yes or No (No = Reject) — Yes / No |
| 💡 | #0030 | 50 Samples | Does finish/plating match approved sample? | 📷 | ✏️ | Yes or No (No = Reject) — Yes / No |
| 💡 | #0040 | 50 Samples | Is the overall cleanliness acceptable? - look for grease marks, dirty mark, dust, etc. | 📷 | ✏️ | Yes or No (No = Reject) — Yes / No |
| 💡 | #0050 | 50 Samples | Do all samples look the same and match approved sample? | 📷 | ✏️ | Yes or No (N = Reject) — N/A |
| 💡 | #0060 | 5 Samples | Does the handle withstand 10lb pull force? Does a pull test end cap of the handle to withstand 10lb pull force? | 📷 | ✏️ | Yes or No (N = Reject) — N/A |
| 💡 | #0070 | 5 Samples | Is the handle secure and able to withstand 25lb pull force? | 📷 | ✏️ | Yes or No (No = Reject) — Yes / No |
| | #0080 | 5 | Do dimensions and weight match approved gold sample? | 📷 | ✏️ | Yes or No (N = Reject) — Results |

Operations Overview

[Back]

Feb 26, 2013   SC600851   TIANJIN THL TABLEWARE CO LTD   700 000 04656   450 003 8201   Feb 26, 2013   [IN PROGRESS]

| Operation # | Description | | | Required | Open |
|---|---|---|---|---|---|
| 0800 | RECORDS REVIEW | | | 15 | 14 |

| | | | | Yes or No (No = Reject) |
|---|---|---|---|---|
| #0010 1 Samples | Were you allowed/able to complete a payroll review? | 📷 | ✏️ | Yes / No |
| #0020 1 Samples | Did the factory allow you to access the payroll records? | 📷 | ✏️ | Yes / No |

🔒

| | | | | Number of nonconforming units |
|---|---|---|---|---|
| #0040 1 Samples | Enter the # of employees found in the records? | 📷 | ✏️ | ✏️ |

| | | | | Yes - No - N/A (N = Reject) |
|---|---|---|---|---|
| #0050 1 Samples | Did employee regular wages meet or exceed local minimum wage? | 📷 | ✏️ | Yes / No |

| | | | | Yes or No (No = Reject) |
|---|---|---|---|---|
| #0060 1 Samples | Did employees receive proper overtime rate per local law? | 📷 | ✏️ | Results |

🔒

| | | | | Yes - No - N/A (N = Reject) |
|---|---|---|---|---|
| #0080 1 Samples | Did employees receive proper holiday rate per local law? | 📷 | ✏️ | Results |
| #0090 1 Samples | Were illegal deductions taken from employee wages? | 📷 | ✏️ | Yes / No |

Operations Overview

Back | Feb 26, 2013 | SC600851 TIANJIN THL TABLEWARE CO LTD | 700 000 04656 450 003 8201 | Feb 26, 2013 | IN PROGRESS

| Operation # | Description | Required | Open |
|---|---|---|---|
| 0800 | RECORDS REVIEW | 14 | 14 |

0010 — 1 Samples — Were you allowed/able to complete a payroll review? — Yes or No (No = Reject) — Yes | No

0040 — 1 Samples — Enter the # of employees found in the records? — Number of nonconforming units

0050 — 1 Samples — Did employee regular wages meet or exceed local minimum wage? — Yes - No - N/A (N = Reject) — Results

0060 — 1 Samples — Did employees receive proper overtime rate per local law? — Yes or No (No = Reject) — Yes | No

0080 — 1 Samples — Did employees receive proper holiday rate per local law? — Yes - No - N/A (N = Reject) — Results

0090 — 1 Samples — Were illegal deductions taken from employee wages? — Yes or No (No = Reject) — Yes | No

FIG. 13E

Operations Overview

Back

Feb 26, 2013 | SC600851 TIANJIN THL TABLEWARE CO LTD | 700 000 04656 / 450 003 8201 | Feb 26, 2013 | IN PROGRESS

| Operation # | Description | Required | Open |
|---|---|---|---|
| 0800 | RECORDS REVIEW | 15 | 14 |

0010 / 1 Samples — Were you allowed/able to complete a payroll review? — Yes or No (No = Reject) — Yes / No

0020 / 1 Samples — Did the factory allow you to access the payroll records? — Yes or No (No = Reject) — Yes / No

0040 / 1 Samples — Enter the # of employees found in the records? — Number of nonconforming units

0050 / 1 Samples — Did employee regular wages meet or exceed local minimum wage? — Yes - No - N/A (N = Reject) — Results

0060 / 1 Samples — Did employees receive proper overtime rate per local law? — Yes or No (No = Reject) — Yes / No

0080 / 1 Samples — Did employees receive proper holiday rate per local law? — Yes - No - N/A (N = Reject) — Results

0090 / 1 Samples — Were illegal deductions taken from employee wages? — Yes or No (No = Reject) — Yes / No

FIG. 13F

| | Operations Overview | | | | |
|---|---|---|---|---|---|
| Back | | | | | |
| Feb 26, 2013 | SC600851 TIANJIN THL TABLEWARE CO LTD | 700 000 04656 450 003 8201 | Feb 26, 2013 | IN PROGRESS | |
| Operation # | Description | | | Required | Open |
| 0800 | RECORDS REVIEW | | | 15 | 14 |

| | | | | | |
|---|---|---|---|---|---|
| #0010 1 Samples | Were you allowed/able to complete a payroll review? | 📷 | ✎ | Yes or No (No = Reject) Yes \| No | |
| #0030 1 Samples | Were you able to review an itemized breakdown to verify proper wages asnd hours? | 📷 | ✎ | Yes or No (No = Reject) Yes \| No | |
| #0040 1 Samples | Enter the # of employees found in the records? | 📷 | ✎ | Number of nonconforming units ✎ | |
| #0050 1 Samples | Did employee regular wages meet or exceed local minimum wage? | 📷 | ✎ | Yes - No - N/A (N = Reject) Results | |
| #0060 1 Samples | Did employees receive proper overtime rate per local law? | 📷 | ✎ | Yes or No (No = Reject) Yes \| No | |
| #0080 1 Samples | Did employees receive proper holiday rate per local law? | 📷 | ✎ | Yes - No - N/A (N = Reject) Results | |
| #0090 1 Samples | Were illegal deductions taken from employee wages? | 📷 | ✎ | Yes or No (No = Reject) Yes \| No | |

FIG. 13G

Operations Overview

March 7, 2013 — 5084423 FW PRO SS SLOTTED TURNER — 58399 450 003 8201 — March 15, 2013 — IN PROGRESS

| Operation # | Description | Required | Open |
|---|---|---|---|
| 0150 | Lot | 4 | 4 |
| 0200 | Carton | 4 | 4 |
| 0250 | Carton Master | 4 | 4 |
| 0300 | Carton Inner | 4 | 4 |
| 0350 | Packaging - Poly Bag General | 1 | 1 |
| 0400 | Packaging | 10 | 10 |
| 0450 | Packaging Box - RM | 7 | 7 |
| 0500 | Product | 14 | 6 |
| 0550 | Badge | 3 | 3 |
| 0575 | Matt Test Characteristic | 3 | 3 |

| | | | |
|---|---|---|---|
| #0010 10 Samples | Does Volume = 32 OZ (4 Cups)? Must be within +/− 1 Ounce. | | 31.00 .. 33.00 OZ  Results |
| #0020 10 Samples | Measure Length, must = 12 inches | | 12.00 .. 12.00 IN  Results |
| #0030 10 Samples | indiv. results. | | 30 .. 40 OZ  Results |

| 0600 | End of Inspection | 1 | 1 |

| Operation # | Description | Required | Open |
|---|---|---|---|
| 0150 | Lot | 4 | 4 |
| 0200 | Carton | 4 | 4 |
| 0250 | Carton Master | 4 | 4 |
| 0300 | Carton Inner | 4 | 4 |
| 0350 | Packaging - Poly Bag General | 1 | 1 |
| 0400 | Packaging | 10 | 10 |
| 0450 | Packaging Box - RM | 7 | 7 |
| 0500 | Product | 14 | 6 |
| 0550 | Badge | 3 | 3 |
| 0575 | Matt Test Characteristic | 3 | 2 |

Operations Overview — Back

March 7, 2013 | 5084423 FW PRO SS SLOTTED TURNER | 58399 450 003 8201 | March 15, 2013 | IN PROGRESS

0010 — 10 Samples — Does Volume = 32 OZ (4 Cups)? Must be within +/− 1 Ounce. — 31.00 .. 33.00 OZ — 32.4

0020 — 10 Samples — Measure Length, must = 12 inches — 12.00 .. 12.00 IN — Results

0030 — 10 Samples — indiv. results. — 30 .. 40 OZ — Results

| 0600 | End of Inspection | 1 | 1 |

Previous Defects

Material - Description

Material - Description

Material - Description

Material - Description

Log Defect

Populate defect code defects

Location

Detail

Picture

Submit

FIG. 14A

Previous Defects - Detail

Defect Code

Defect Status

Location

Detail

FIG. 16

Inspection Procedures

Material - Description

Material - Description

Material - Description

Material - Description

Procedure - Detail

EXTRACT OF METHOD

FIG. 18

| LAYER 7 | | | |
|---|---|---|---|
| Inspection Operation: 0010 - Inspection Lot | | Tools Required: SYRINGE | |
| Chracteristic Type: 0010 - Must be 80% Packed, 100% Produced | | Method | PDF |
| Long Test (From Characteristic) | | (show links) | JPG |
| | | | MOV |
| Number Units to Test: | 1 EA (Sample Size) from insp lot | | |
| # Units Tested | (Auto to populate Sample size) - if overridden and less than the sample size needs to force close the characteristic in SAP | | |
| Specification | being presented from lot | | |
| Result (code group char 1) | | | |
| Example: | Yes | | |
| | No | | |
| Long Text | Inspector enters details about the result (if needed) | | |
| *Origin results data should be pushed back to sap as "00 From Mobile data recording" | | | |
| | | Submit - if defects, record defects | |

FIG. 22

METHOD AND APPARATUS FOR MOBILE QUALITY MANAGEMENT INSPECTIONS

CROSS REFERENCE TO RELATED APPLICATIONS

This application is a Continuation of U.S. Ser. No. 16/051,545 filed Aug. 1, 2018, which is a Continuation of U.S. Ser. No. 14/778,211 filed Sep. 18, 2015, now U.S. Pat. No. 10,127,523, which is a U.S. National Stage application of PCT/2014/031223 filed Mar. 19, 2014, and which PCT application claims priority from U.S. Provisional Application Ser. No. 61/803,501 filed Mar. 20, 2013.

BACKGROUND

Technical Field

The present principles relate to quality control in product manufacturing and production. More particularly, it relates a method and apparatus for quality control/management inspections on site.

Related Art

To date, the quality management inspection process is largely paper based. Inspectors perform on site source inspections and social compliance audits utilizing spreadsheet documentation, and there is no visibility of results available in known and existing Quality Management inspection systems.

SUMMARY

The quality management inspection system of the present principles provides a standardized inspection process that is visible throughout the entire supply chain. This present quality management inspection system and method is a mobile solution that completely replaces the current paper based system of results recording.

According to one implementation, the mobile Quality Management Inspection System includes a mobile device in communication with at least one network server and a database in communication with the network server. The mobile device has a display screen and input means for inputting data, the data including photographs. The database is configured to receive and store all data input to the mobile device during an inspection. The mobile device is configured to enable an inspector to perform source inspection; receiving inspection; product qualification inspection; social compliance, CTPAT and factory valuations; non-conformance processing and document management and upload this information to the database in substantially real time.

According to another implementation, a method for mobile Quality Management Inspections includes the steps of creating an inspection lot in response to a vendor's completion of an order and recording inspection results using a mobile device in communication with at least one network server. The mobile device has a display screen and input means for inputting data, the data including photographs. Once results are recorded, a usage decision process is performed on accepted inspection lots and a non-conformance process is performed on unaccepted inspections lots.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which:

FIGS. 7A-21 are examples of the quality management application display screens and layouts of the same as presented to the inspector during the QM procedure, according to an implementation of the present principles; and FIG. 22 is an example of a recording layer of results recording display as depicted in FIGS. 13A-13J, according to an implementation of the present principles.

DETAILED DESCRIPTION

Figure 1:
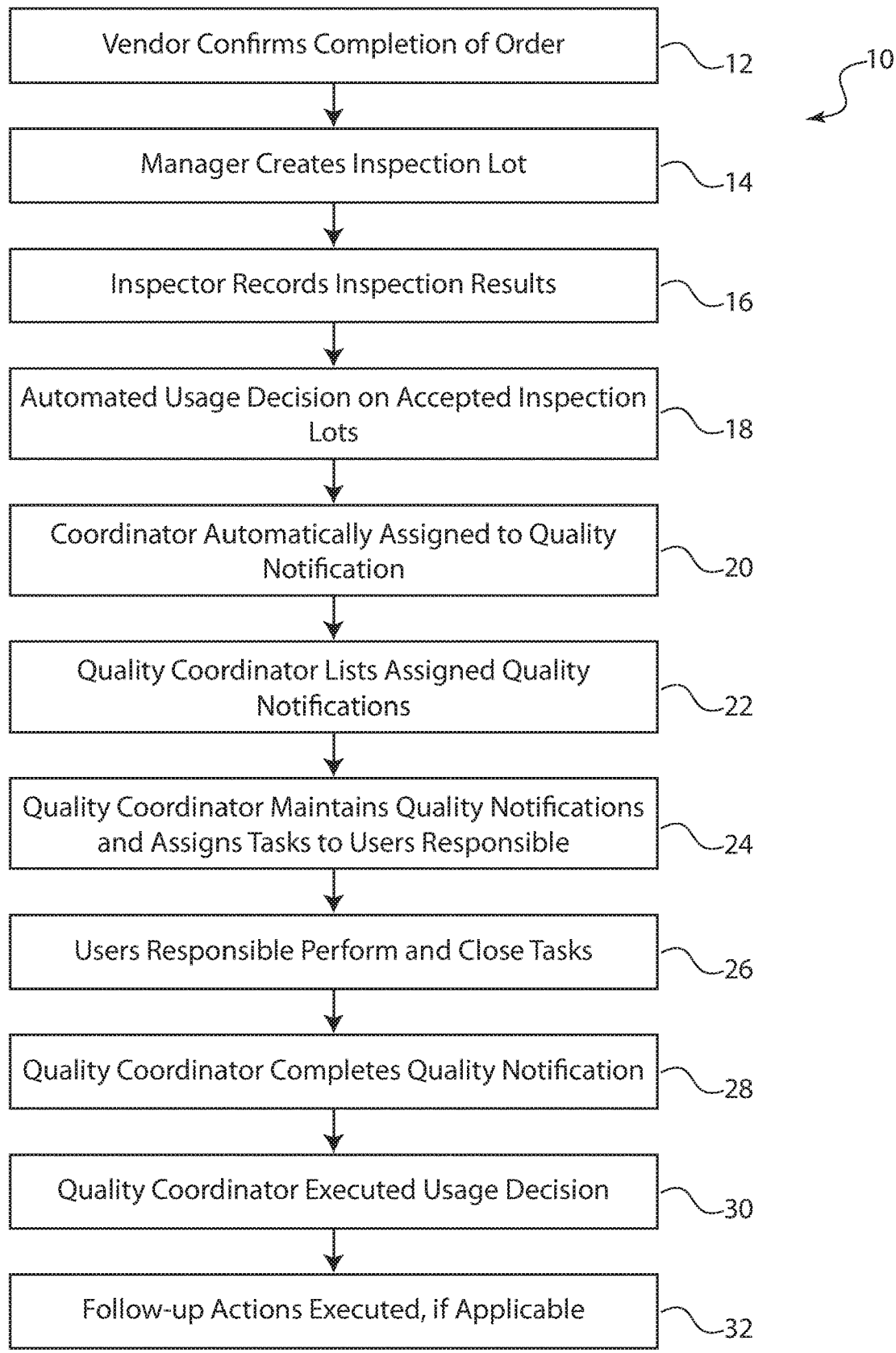
FIG. 1 is a high level flow diagram of the quality management (QM) inspection process according to an implementation of the present principles.

The present principles are directed to Quality Control and Quality Management inspections during, and more particularly a completely integrated method and system for enabling mobile, on site Quality control and Quality Management inspections.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

The present principles provides a mobile solution which enables a mobile system for ensuring compliance with customer and regulatory requirements at the following inspection stages: source inspection; receiving inspection; product qualification inspection; social compliance, CTPAT and factory valuations; non-conformance processing and document management.

Within the context of the present disclosure, source inspection is the inspection of products at the factory location prior to being shipped to the customer ordering the same. Receiving inspection is the inspection of received products prior to being considered acceptable for use by production. Product qualification inspection is the inspection of a produce prior to full production for the purpose of qualifying the production process. Social compliance, CTPAT and factory valuation are inspections that are required to be performed as part of a vendor audit process. Non-conformance processing is the ability to record and analyze non-conformance data. Document management is the electronic management of all documentation related to production and/or purchasing of materials/parts.

Those of skill in the art will recognize that the exemplary embodiments of the present principles are described in the context of a system what works with SAP® software systems for Quality management (e.g., Sybase Mobility Suite)—SAP is registered trademark of SAP Aktiengesellschaft in Germany. However, such integration with known quality management software systems and databases is only one implementation and other independent systems and databases can be also implemented with the present principles without departing from the intended scope thereof.

As referred to herein, when applicant states that data is "sent to SAP", the intended meaning is that the inspection data is sent to the SAP Sybase mobility database maintained by the respective customer performing the inspection, in accordance with SAP's licensing and use requirements.

There are several process steps in the mobile quality management (QM) inspections systems of the present principles. FIG. 1 shows the summary of the process 10 for mobile management inspections according to an implementation of the present principles. Various details of the processes will be described in further detail below. Initially, a vendor confirms completion 12 of an order. A manager creates an inspection lot 14 for that order. The inspector records inspections results 16, and an automated usage decision 18 is performed on the accepted inspection lots. A coordinator is automatically assigned 20 to created quality notifications when the inspection lot has not been accepted by the inspector. The Quality Coordinator lists the assigned quality notifications 22 and maintains the same while also assigning tasks to users responsible (24). The users responsible perform and close the tasks when done 26. The Quality coordinator then completes the quality notification 28, and executes the usage decision by "Accepting" the same 30. If there are any follow up actions to be executed, they are at this point in the process (32)

Figure 2:
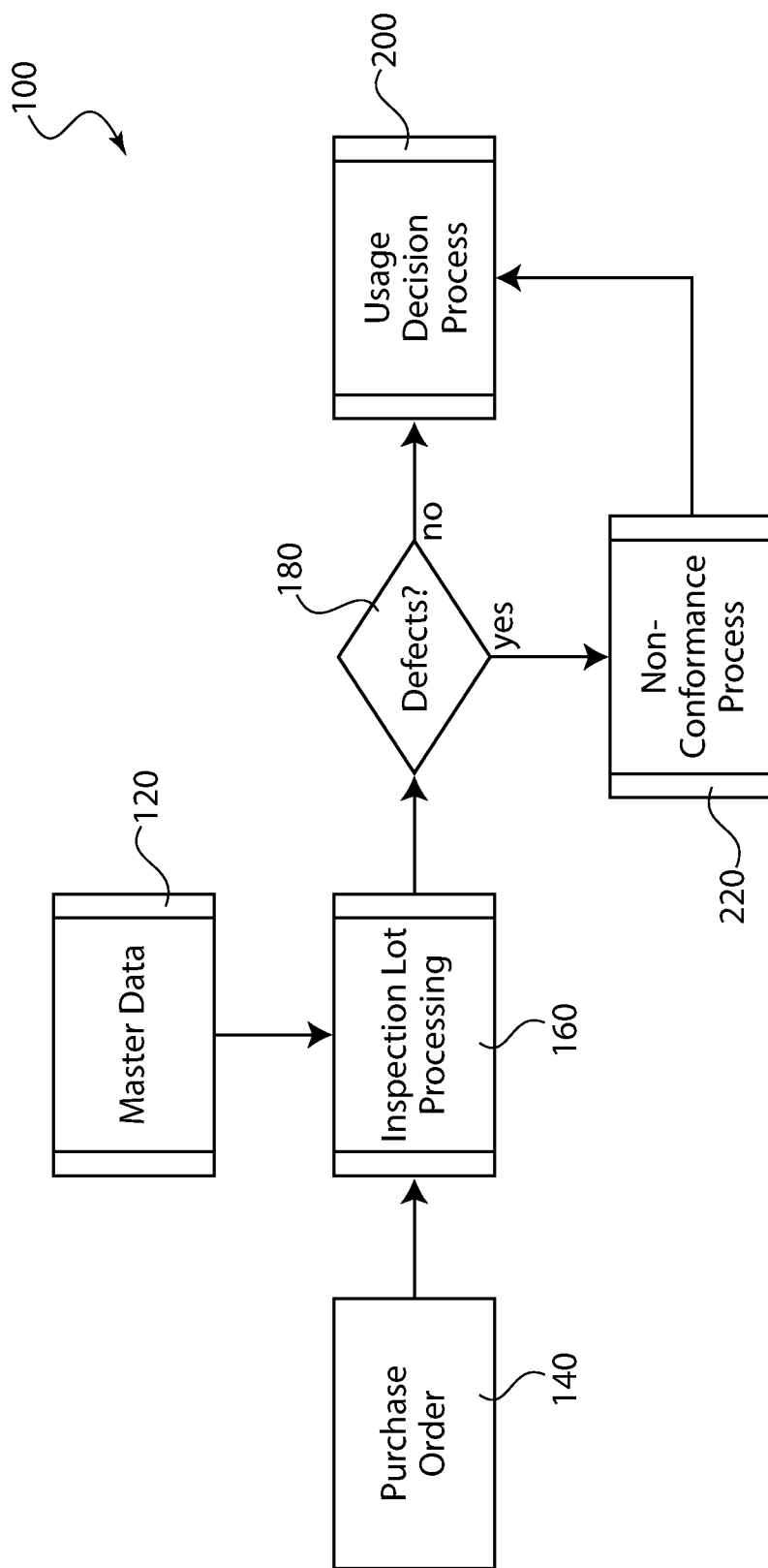
FIG. 2 is a flow diagram of the inspection lot processing according to an implementation of the present principles.

Referring to FIG. 2, there is shown a process overview of the method 100 for quality management inspections according to an implementation of the present principles. Master data 120 and a purchase order data 140 (e.g., vendor confirms completion of order) are used to create the inspection lot which is part of the inspection lot processing 160. Here, the inspection lot has been created by the Manager (step 14, FIG. 1). As part of the inspection lot processing, the inspector inspects and records the results of their inspection. If there are any defects (180) noted in the inspector's results, a non-conformance process 220 is executed. If there are no defects, the automated usage decision process 200 is executed.

By way of example, the master data 120 can consist of many different pieces of data. Table 1 shows an example of such master data, the associated organization object or master data with corresponding descriptions.

TABLE I

MASTER DATA STRUCTURES

| ID | Relevant Master Data | Associated Org. Object or Master Data | Explanation (if necessary) |
|---|---|---|---|
| 1 | Material Master | Plant Sales Organization Distribution Channel Profit Center | |

TABLE I-continued

MASTER DATA STRUCTURES

| ID | Relevant Master Data | Associated Org. Object or Master Data | Explanation (if necessary) |
|---|---|---|---|
| 2 | Quality Information Record | Material Plant Vendor | If a source inspection or a vendor release is required for a material, you must create a quality information record (QIR). The quality info record determines how the material can be processed further. |
| 3 | Work Center | Plant Cost Center | |
| 4 | Catalogs | Client | Catalogs are used to manage, uniformly define, and standardize information. They can help you to record and subsequently evaluate qualitative data, and to describe problems. |
| 5 | Selected Sets | Plant | A selected set contains a combination of different codes at plant level, for example, coded descriptions of characteristic attributes (such as color, shape, surface characteristics), defect codes or usage decisions from different code groups. |
| 6 | Sample Scheme | | A sampling scheme applies to the sample size based on a specific inspection lot quantity and defines the criteria for determining whether and how a sample is accepted or rejected. |
| 7 | Dynamic Modification Rule | | The basic data record contains the definition of the inspection stages, the dynamic modification time (at lot creation or after the usage decision has been made), and the conditions for the inspection stage change. Inspection stage changes occur on the basis of the inspection results that are recorded for inspection lots and inspection characteristics (that is, on the basis of their acceptance or rejection |
| 8 | Sample Procedure | | A sampling procedure defines the rules that specify how the system calculates the sample size and it contains information about the valuation of an inspection characteristic during results recording (attributive, variable, manual, etc.). |
| 9 | Inspection Plan | Plant Material Vendor | |

Figure 3:
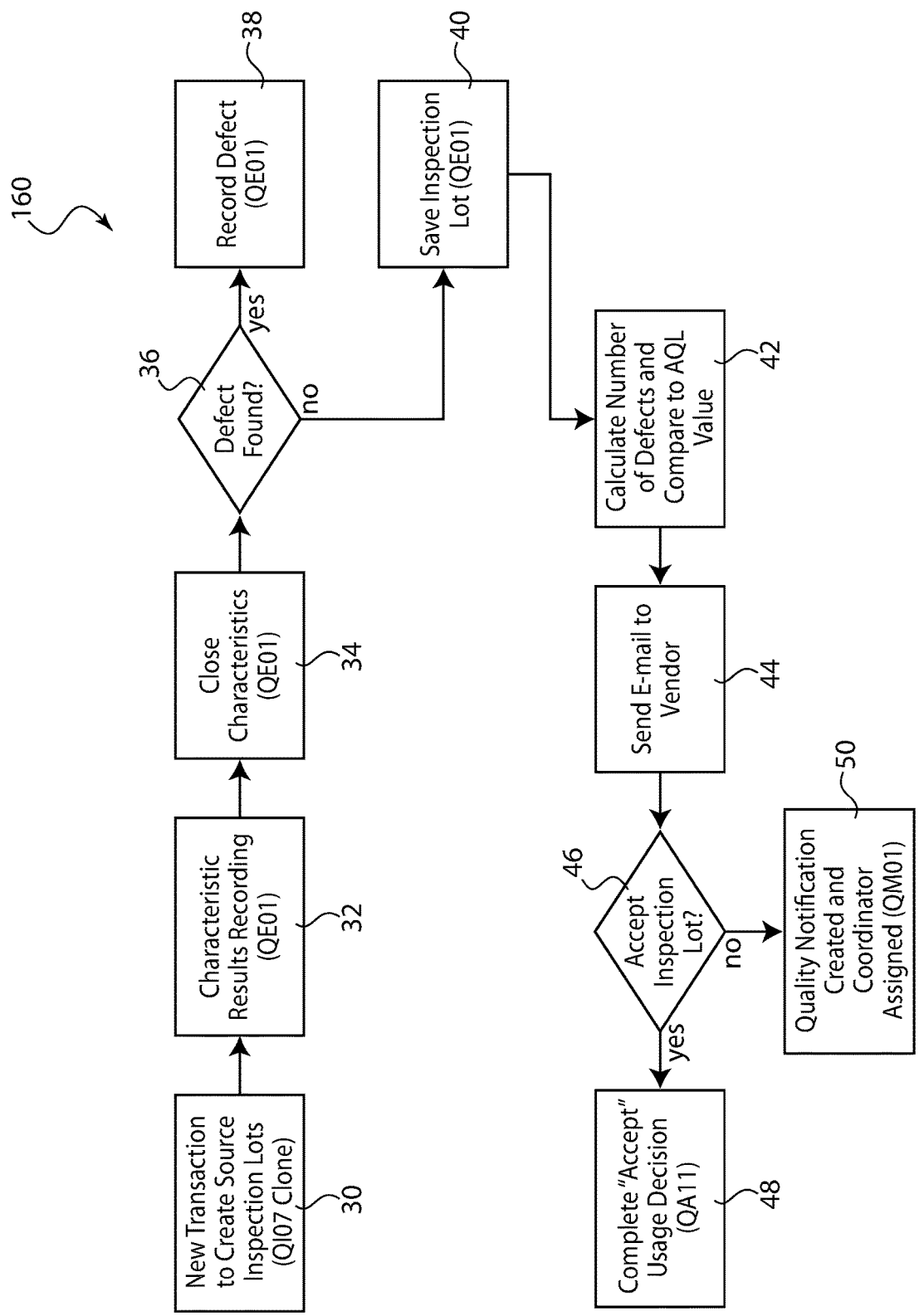
FIG. 3 is a flow diagram of the non-conformance processing according to an implementation of the present principles.

FIG. 3 shows an example of the process for the inspection lot processing 160, according to the present principles. Initially, a new transaction to create source inspection lots is generated 30. Next the characteristic results for the new transaction are recorded 32. Once recorded, the characteristics window is closed 34. A determination is then made (36) whether there is defect found in the product being inspected within the inspection lot (i.e., based on the recorded characteristics). If a defect is found, it is recorded 38. If no defect is found, the inspection lot is saved 40. Once saved, a calculation of the number of defects recorded (step 42) is compared to the AQL value and an email is sent 44 to the vendor with the comparison data. The inspector then decides 46 whether to accept the inspection lot. If not accepted, a Quality Notification is created and a coordinator is assigned 50. If the inspection lot is accepted, the inspector completes an "Accept" Usage decision 48.

Figure 4:
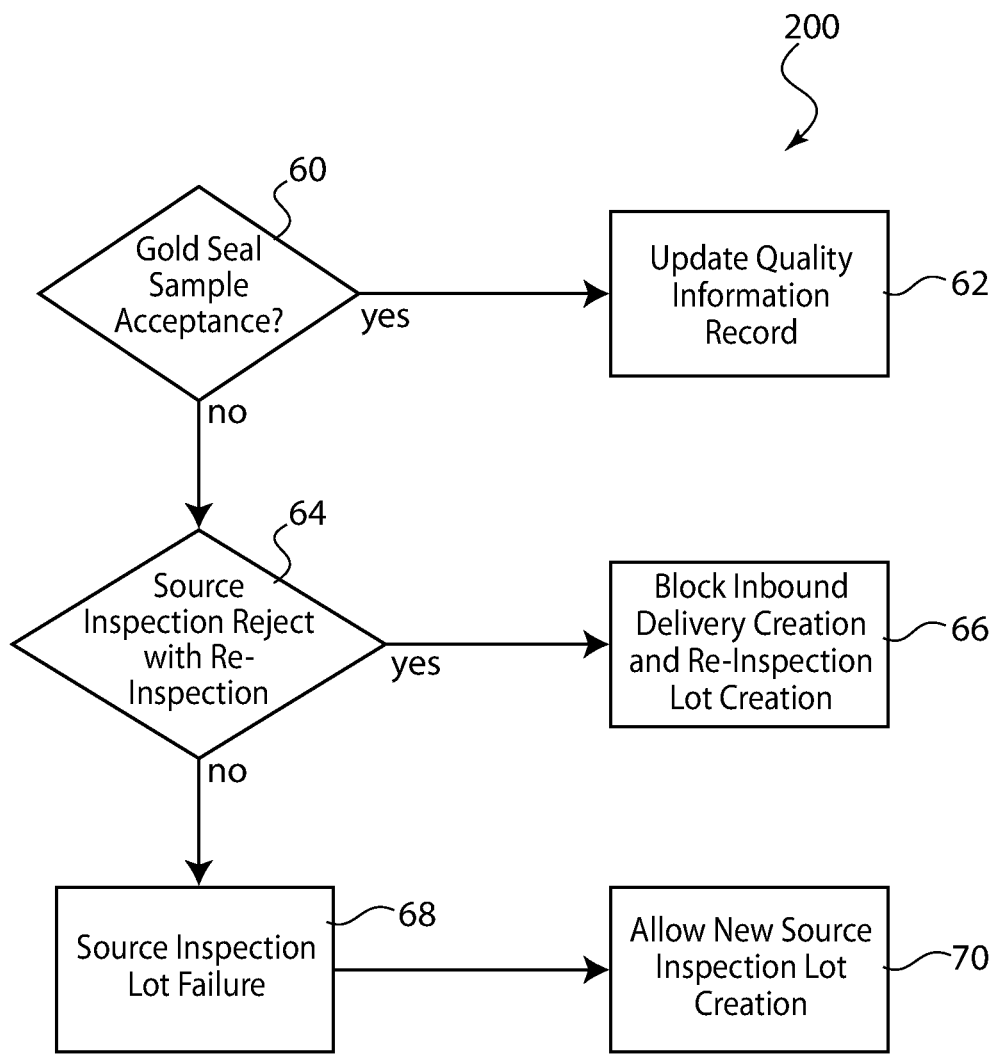
FIG. 4 is a flow diagram of the usage decision follow up process, according to an implementation of the present principles.

FIG. 4 shows a flow diagram of an example of the Usage Decision process 20. Here, a few determinations are made. One, whether a Gold Seal Sample Acceptance has been achieved 60. Those of skill in the art will appreciate that the "Gold Seal Sample" is what the products being inspected should be aiming for in quality and all other aspects of the inspection. If yes, the Quality information record is updated 62. If not, a determination is made 64 whether the source inspection is rejected with re-inspection. If yes (i.e., rejected again), the inbound delivery is blocked and a re-inspection of the lot is scheduled (created) 66. If the source inspection is not rejected with re-inspection, the source inspection lot is identified as a failure 68, and a new source inspection lot is allowed for creation 70.

Figure 5:
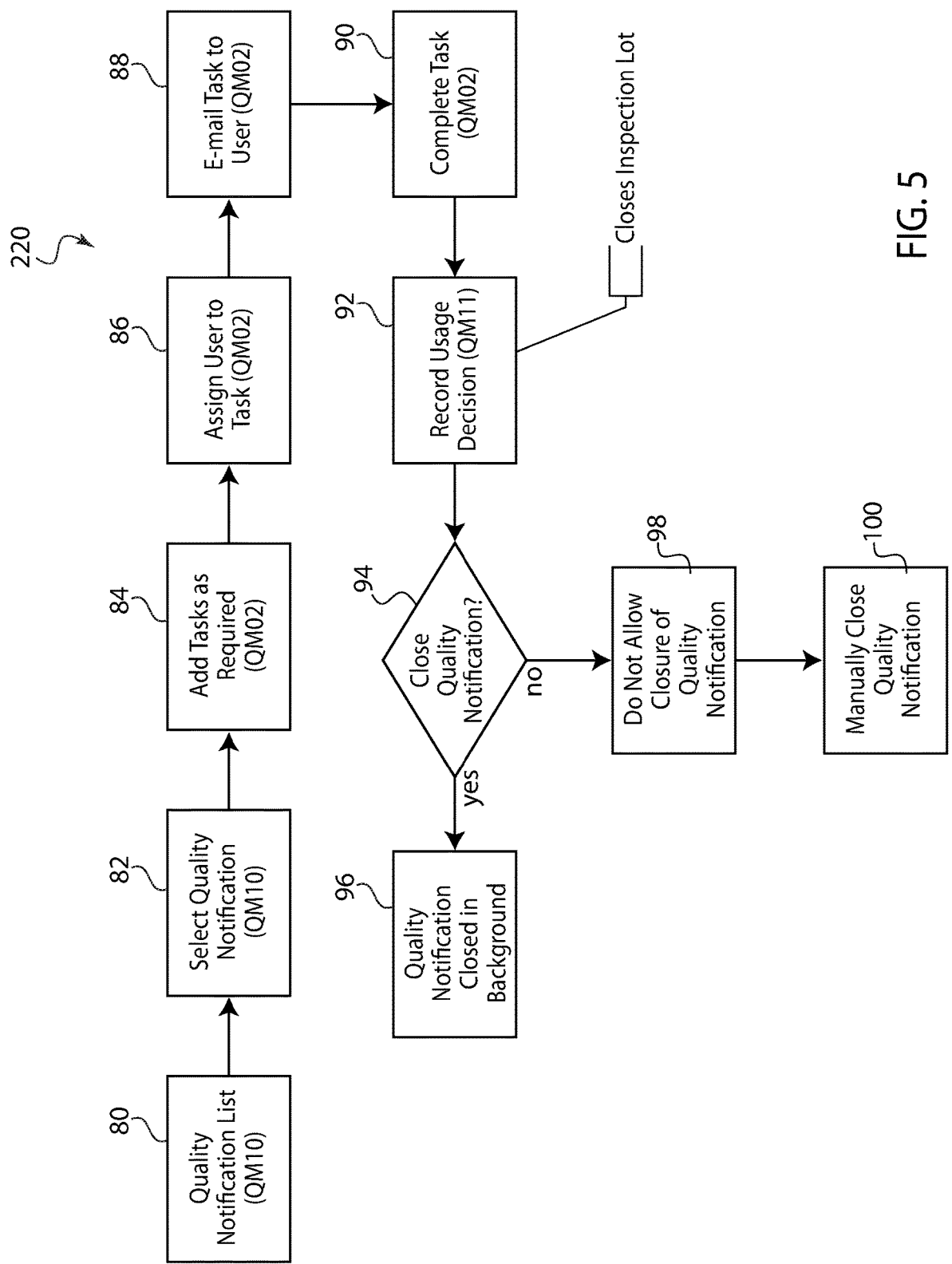
FIG. 5 is a flow diagram of the non-conformance processing, according to an implementation of the present principles.

FIG. 5 shows a flow diagram of example of the non-conformance process 22 according to an implementation of the present principles. A list of Quality Notifications is provided 80. Once the list is a selection of a particular Quality Notification is made 82. Once so selected, Tasks are added as required 84, a user is assigned 86 to each task, and an email is sent 88 to the assigned users. Once the task is complete 90, the usage decision is recorded 92 (which closes the inspection lot). A determination is then made 94 whether to close the Quality Notification. If yes, the Quality Notification is closed in the background of the display 96. If not, the closure of the Quality Notification is not allowed 98, and it must then be manually closed 100.

The above processes are performed using a tablet or other mobile computing device that collects enables the user to view the data collected from all the various logging reports, and/or input their own QM or QC data based on their respective inspections. The following details the creation of the mobile inspection application that is deployed to the employee users. As will be understood by those of skill in the art of Quality Control and Quality Management, there are many users in the chain that are logging reports on a daily basis from a variety of different facilities (sources). These users previously would record results on paper and the result would be little visibility to the reporting results, accuracy, outstanding work lists, etc.

In accordance with a preferred implementation of the present principles, the mobile inspection application disclosed herein will deliver proper inspection procedures and information (substantially in real time), will allow for results recording (including pictures and locations) and allow users to easily track inspection activities whether connected to a data network or working in a remote manufacturing facility.

Figure 6:
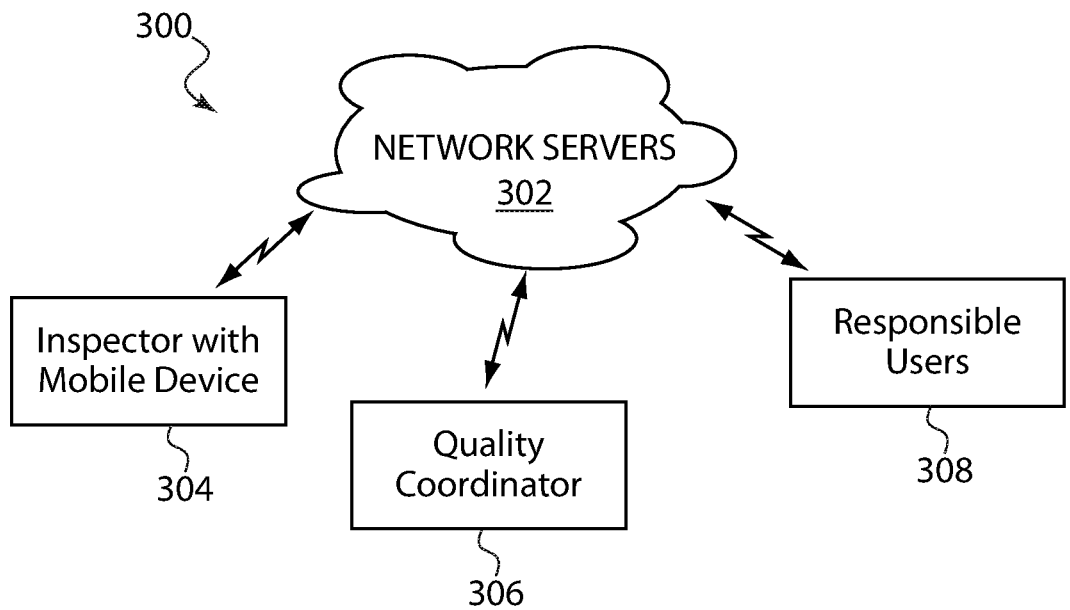
FIG. 6 is a block diagram of the hardware architecture of the quality management system, according to an implementation of the present principles.

FIG. 6 shows a general block diagram of the mobile inspection system 300 according to an implementation of the present principles. An inspector with a mobile device 304 is in communication with a network of servers 302 which are in turn in communication with the quality coordinators 306 and the responsible user 308. The quality coordinators and responsible users consistently update their logs/reports to the network services 302 via their mobile or stationary computing devices at their respective locations. The Inspector, using their mobile device 304, will then have substantially real time updated reports from the various sources in the quality control chain, and will be able to make their own inspection reports which would also be updated and loaded into the network servers 302 for access by supervisors, etc.

Those of skill in the art will appreciate that the term "network server" refers to one or more hardware computing/computer devices having appropriate processing, storage and memory capabilities. The details of types of processors, storage and memory are not provided herein, as those of skill in the art do not require the same. Furthermore, the term "network server" as used herein may refer to "cloud" based servers, "resident" servers maintained by the customer and/or one or more of their vendors though contract, or any other computing platform operating as.

The basis of the Quality Management control application of the present principles is the animated screen flows that provide exactly the information the user is looking for without over-cluttering the screen with information. The following FIGS. 7A-21 provide an overview of the design, screen sequencing, screen positioning and transitions in accordance with one implementation of the present principles.

Figure 7A:
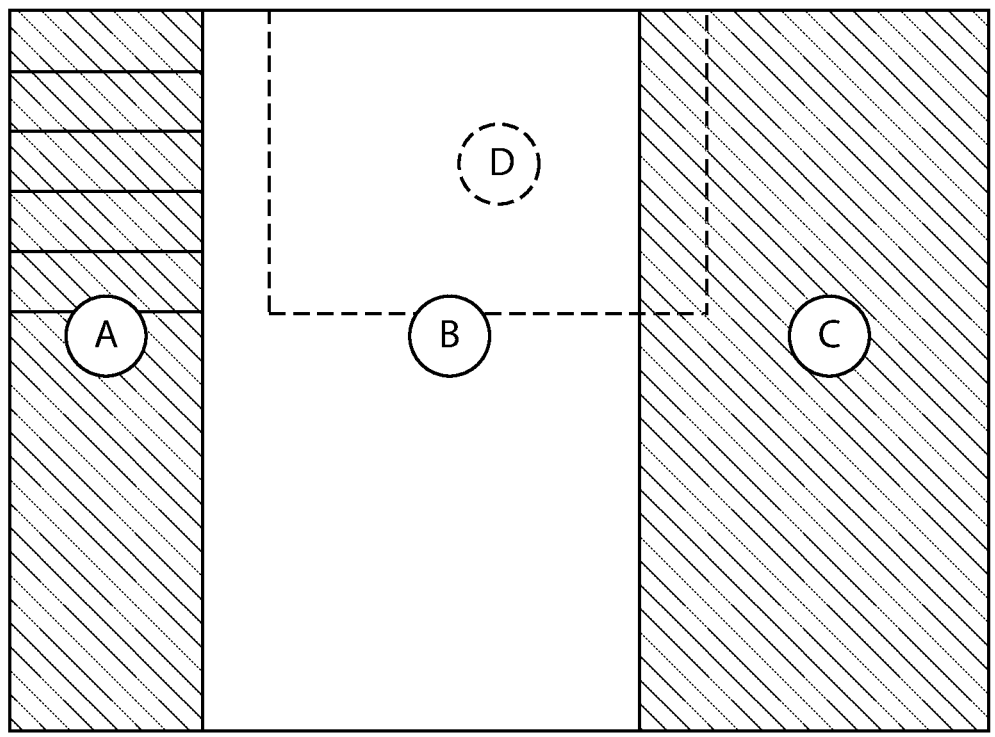
Figure 7B:
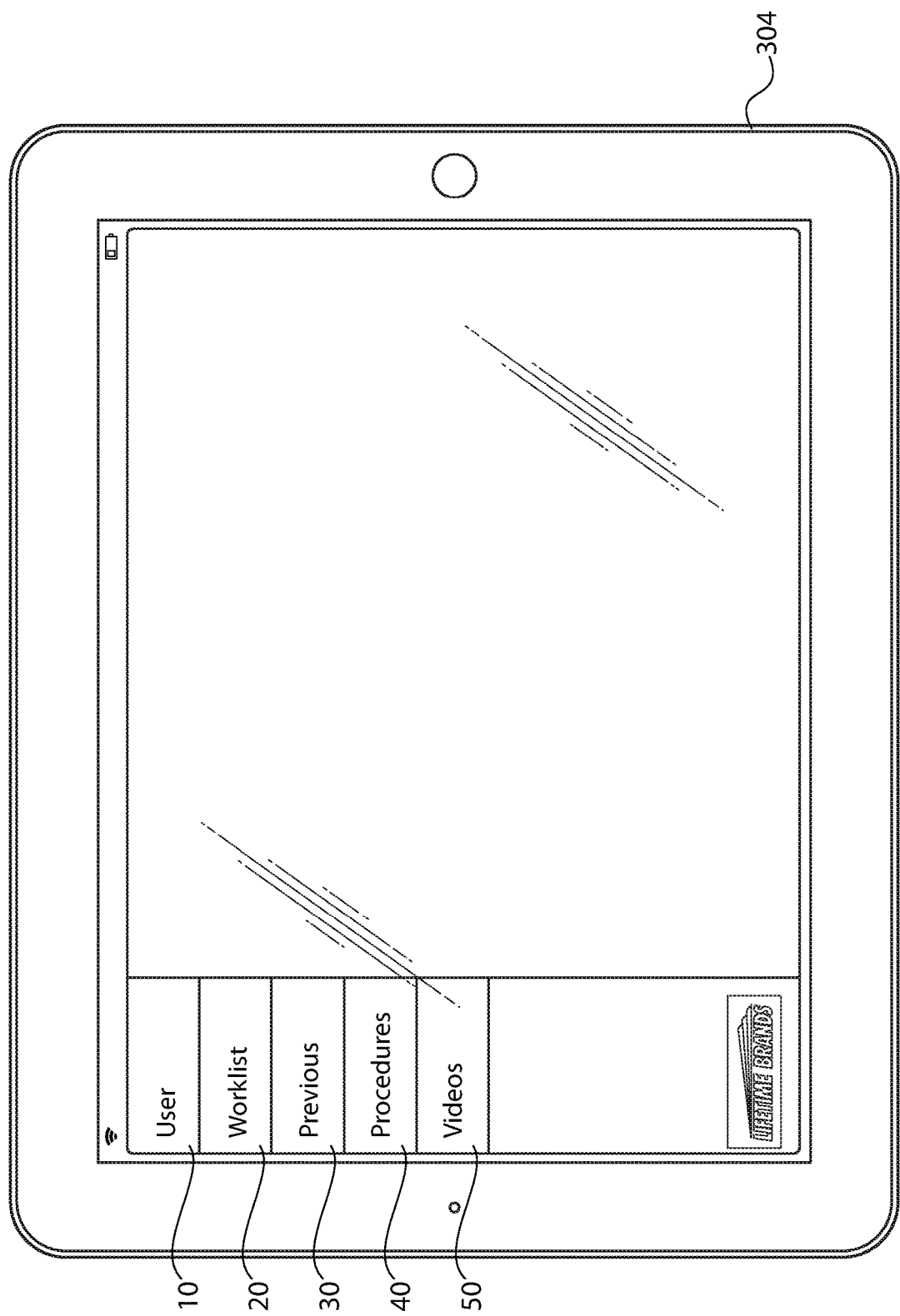

Referring to FIG. 7A, throughout the application, there can be four (4) distinct regions used to present all data. As shown in FIG. 7A and for purposes of this description, the regions are labeled A, B, C, and D and can be layout as shown. FIG. 7B shows the main menu or application background as displayed on a mobile device 304. The background is clear of all extraneous data and essentially acts as the backdrop of the "stack of paper" application design. This application background can cover the entire screen with a series of menu options designated in region A you will see the main menu. The main menu contains several starting points for further information to be brought in from the right hand side of the screen in the other regions B, C and D. These starting points include, for example, User 10 (layer 2), Worklist 20 (layer 3), Previous 30 (layer 8), Procedures 40 and Videos 50. The details of each of these starting points will be described in further detail below.

The application background of FIG. 7B is also referred to as "layer 1" of the application. This layer 1 is preferably always the basis for the application. It will not transition off the screen, and other layers will move over top of it while always remaining in the background and showing as other layers transition on and off the same.

Figure 8:

FIG. 8 shows an example of the User 10 (or layer 2) display according to an implementation of the present principles. A user clicks on "user" from the main menu to access this layer. The user profile contains relevant data to transmit to SAP for user login. Additionally, this section contains application information, system connectivity (connection status), application version, etc. This will also contain the sync functionality (sync button) for pulling data to the application from the SAP Sybase application.

Figure 9A:
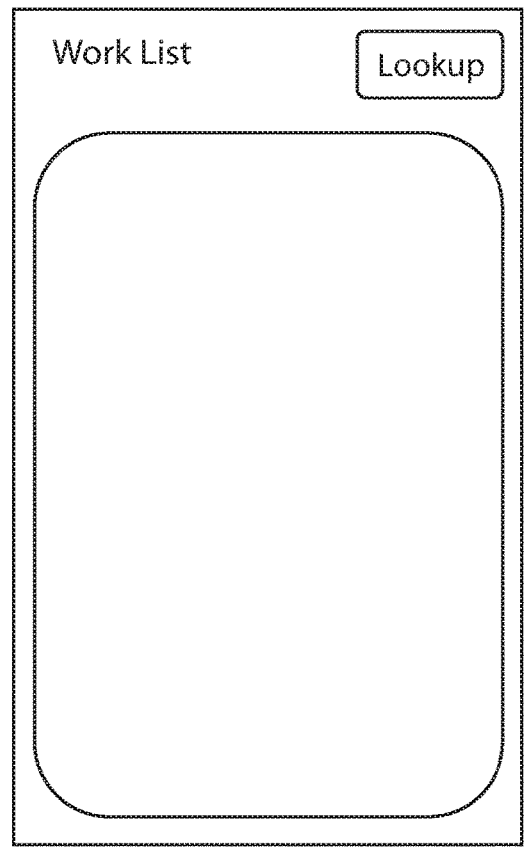

FIG. 9A shows an example of the Worklist 20 (or layer 3) according to an implementation. The work list is where the user will view all outstanding inspections. This list will be dynamic and will be sorted first by start date, then by factory. The dynamic list will be scrollable and will show all items in an inspectors queue for the next 30 days. Both of these pieces of information will be pulled from the SAP Sybase application per the data mapping functionality described later.

Figure 9B:
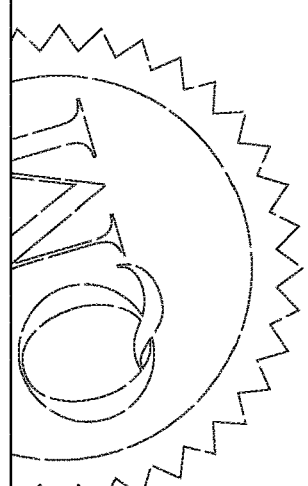

FIG. 9B shows a schematic example of the worklist screen homepage according to an implementation. Here, the dynamic worklist (i.e., the inspections) 200 are each provided in a list. Each line is a different inspection lot or task. Examples of the current types of inspections are: Warehouse audit, Gold Seal Inspection, C-TPAT Inspection, Social Compliance Audit, Factory Evaluation, Source Inspection, and Re-Inspection. Tasks can range from such follow up actions as call/email a factory, to go and visit and document findings. In accordance with one preferred implementation of the present Quality Management system, a scan feature 202 is provided. Utilizing the built in camera of the mobile device, the user is able to narrow down the selection of inspection lots on the worklist homepage by scanning the master barcode of the carton. Subsequently, with in the individual inspections, the user is able to use the same scan feature to scan the master, inner and packaging barcodes, which the QM application of the present principles will validate against information in the source system, which can be symbolized using a Red "X" or a Green "Check". As shown in FIG. 9A, this scan feature is accessed using the "lookup" button on the screen. In other embodiments, the button can be labeled "Scan" as shown in FIG. 9B.

Figure 10A:
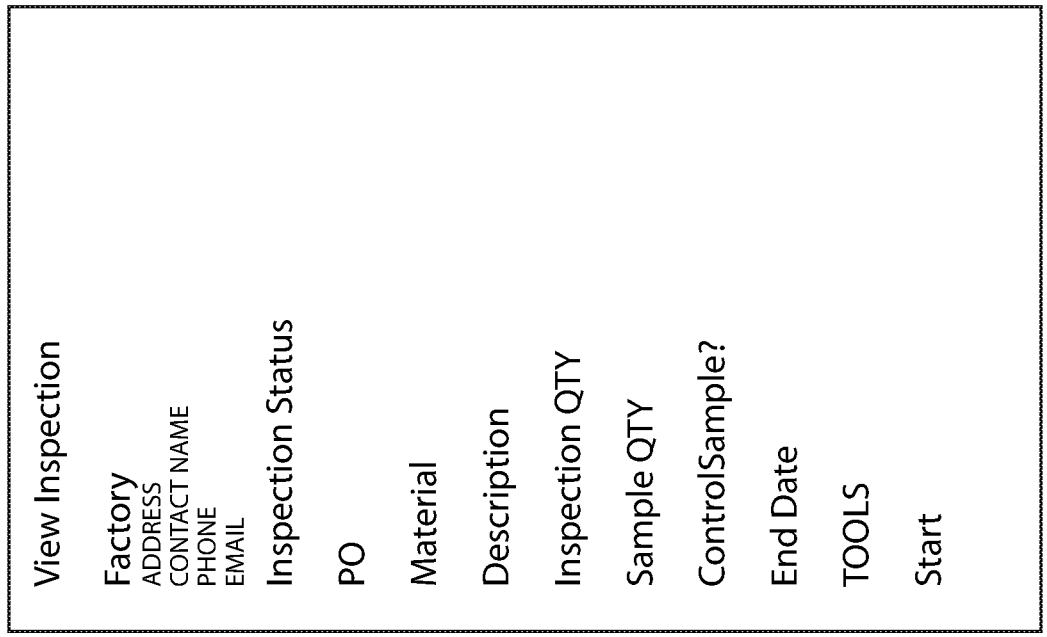

FIG. 10A shows an example of the View Inspection screen (or layer 4). This layer will contain all of the header level information for the user to review. It will contain factory information, purchase order and material information, gold sample information, inspection status, inspection end date and tools required to execute the inspection. Finally, at the bottom of the displayed layer, a "Start" button is provided which will bring the user to the list of inspection groups in layer 5. Additional functions will include, for example, the ability to change inspection quantity and view gold sample found in region D.

Figure 10B:
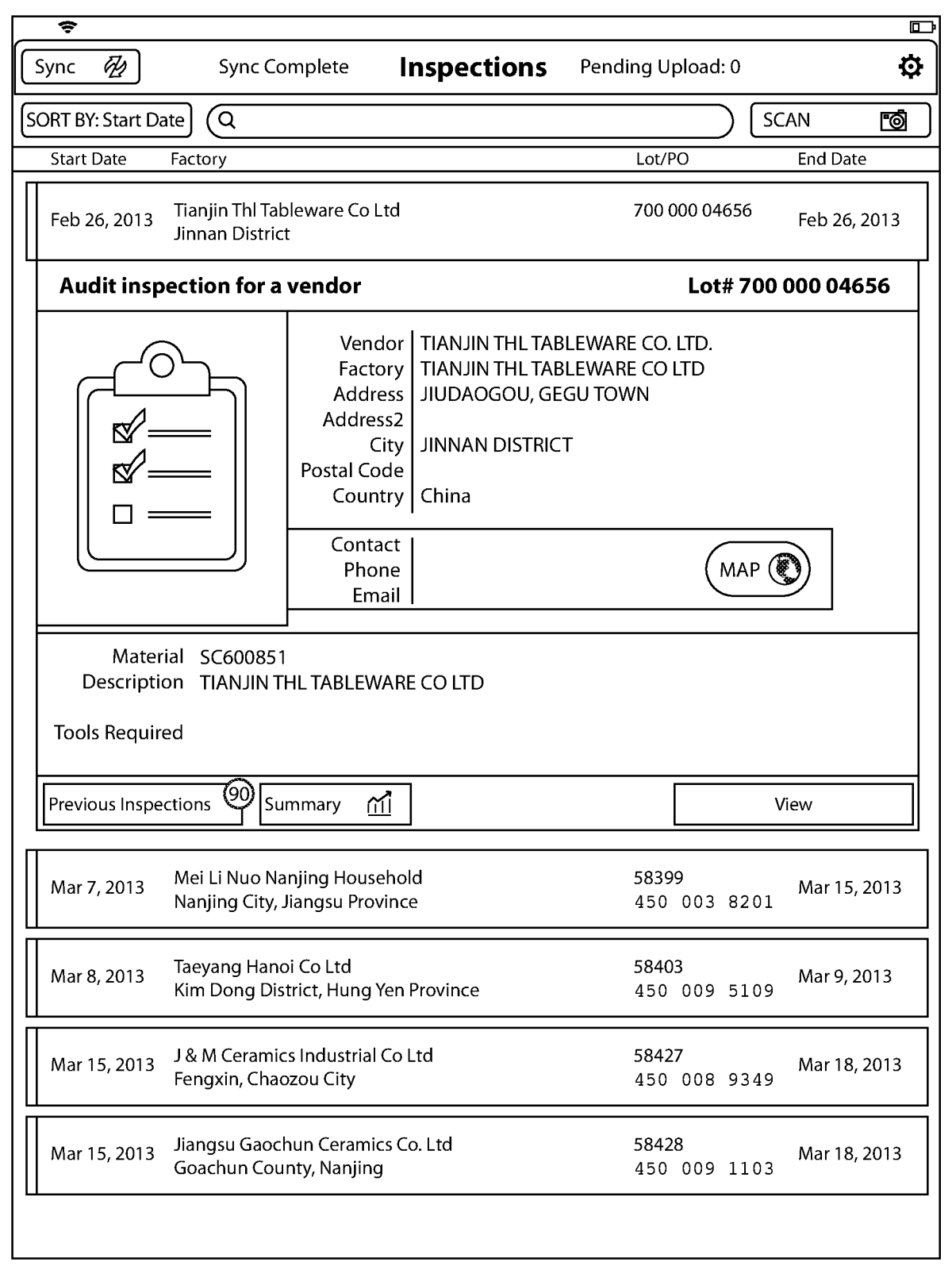
Figure 10C:
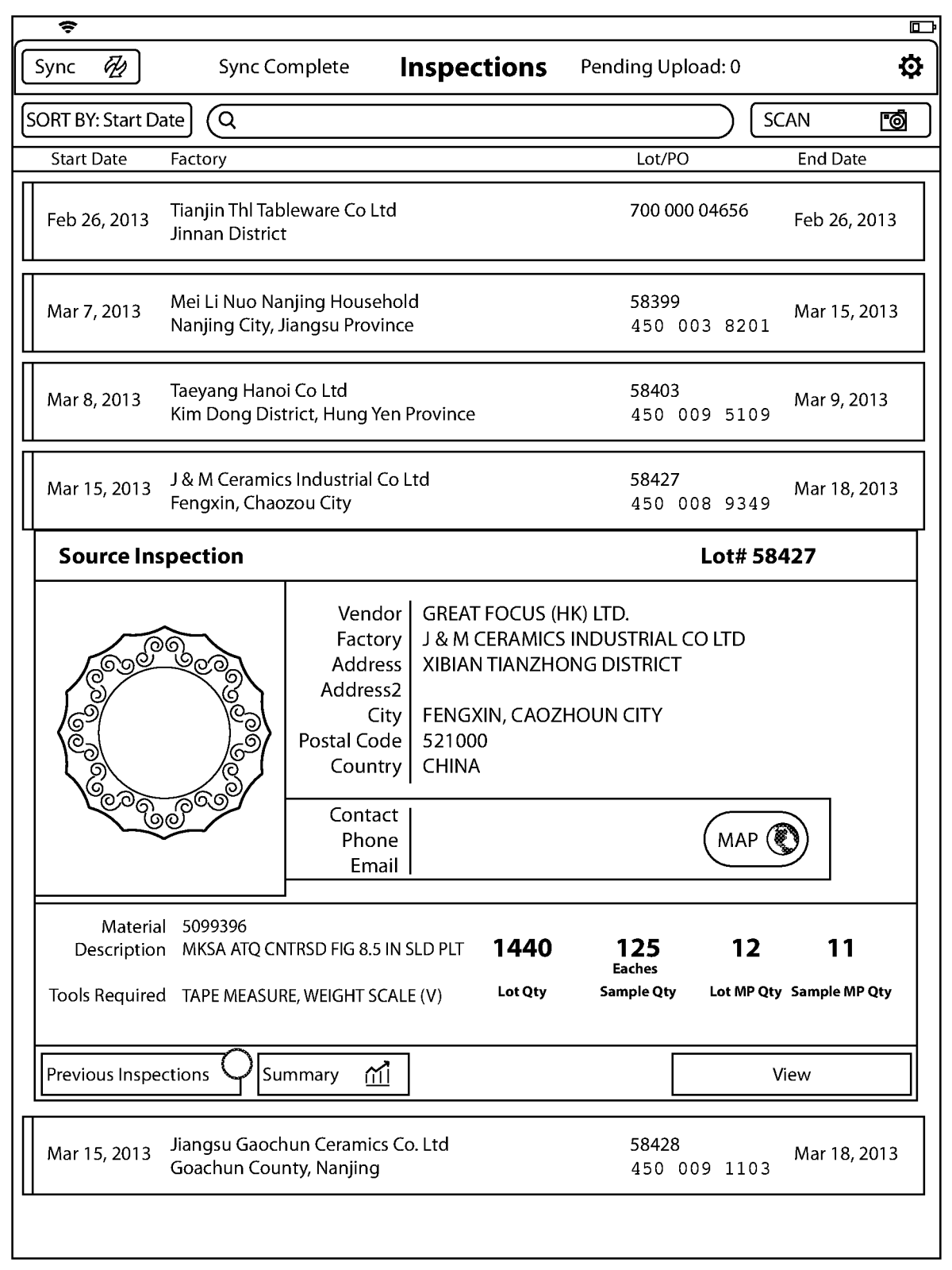
Figure 10E:
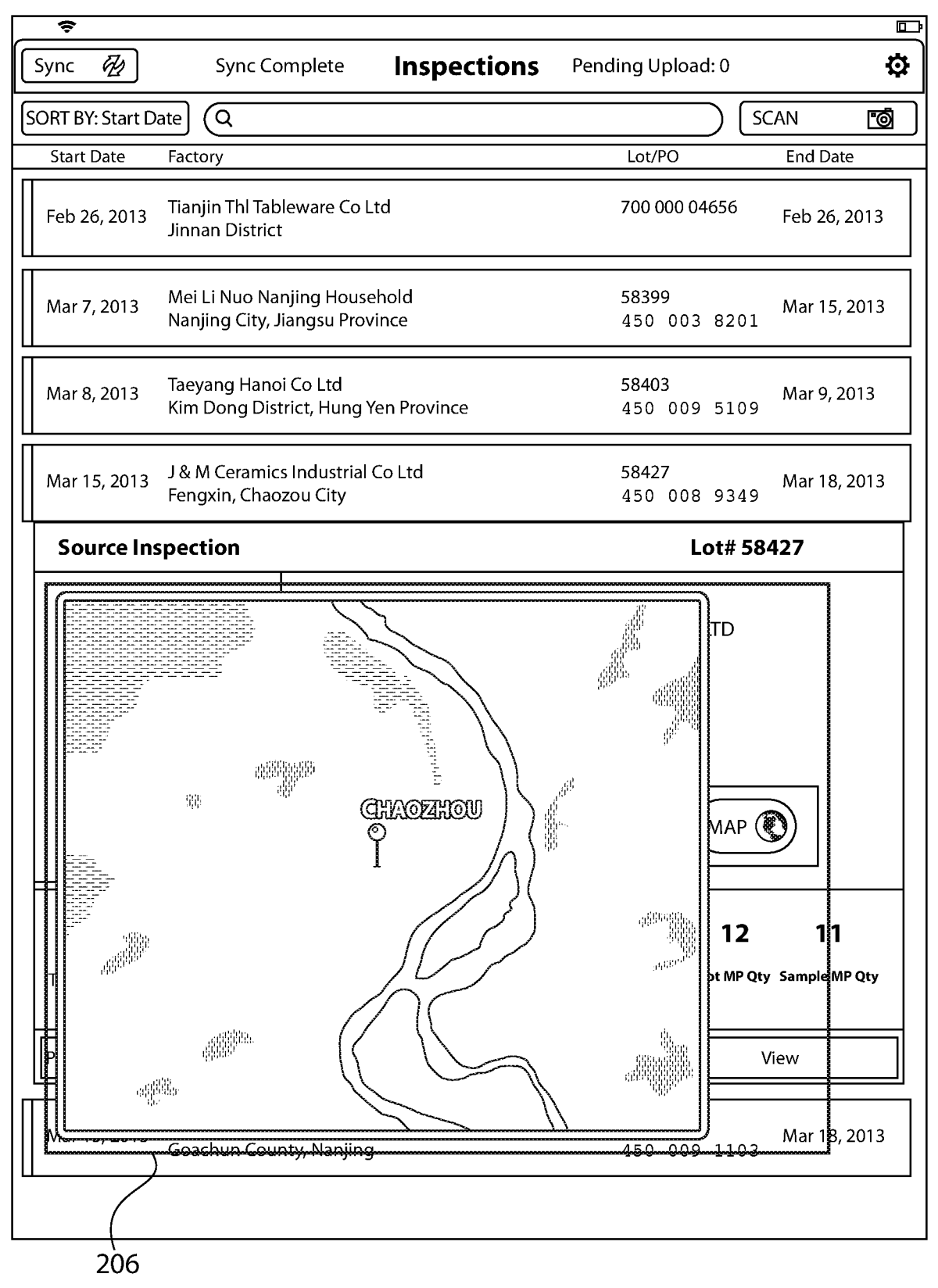

FIGS. 10B-10E show examples of displayed inspection lot header screens according to one implementation of the present principles. FIG. 10B shows an example of the social compliance screen for a specific audit inspection for a vendor as it relates to a specific lot #. FIG. 10C shows an example of the source inspection display screen which provides information as to the vendor, the factory and it's address, a description of the item, tools required for the inspection (202—See FIG. 10D), the lot size and samples quantity 204 (e.g., the sample quantity, the Lot MP quantity and the Sample MP quantity). FIG. 10E shows another feature which may be referred to as a location feature 206 which utilizes the mobile device's mapping function to show the geographical location of the location of the lot inspection.

FIGS. 10F-10H shows examples of the "previous inspections screen" display. Here, the user hits the "previous inspections" button 208 (FIG. 10F) and they are brought to the previous inspections screen where a list of the previous inspections are listed (FIG. 10G), and any one can be selected and viewed. FIG. 10G shows an example where the user may press an "email" button 210 and generate a pre-populated email with the current lot information and previously inspection information (FIG. 10H). Thus, it will be apparent to those of skill in the art that the ability to generate and send an email in real time during an inspection, that also has the ability to include previous inspection data, is an invaluable tool in the Quality Management/Control field.

Figure 10I:
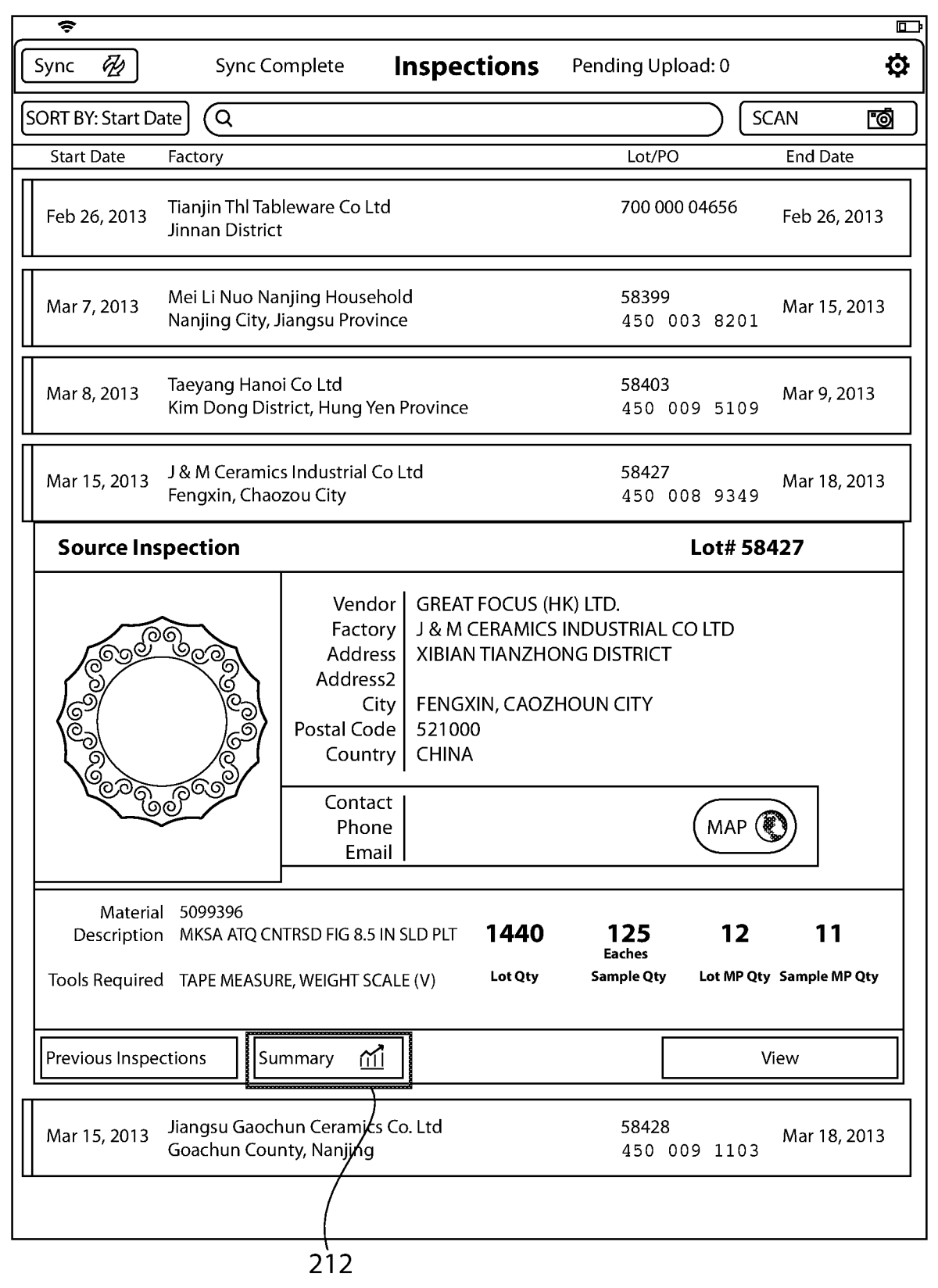

FIGS. 10I-10K show examples of the Inspections summary screen display. Here, the user hits the "summary" button 212 (FIG. 10I). This brings them to the summary screen (FIG. 10J), where a summary of the inspection being performed is provided. Here the user will have the opportunity to make changes or edits as they see necessary. As with the previous inspections display, the user continues to have the ability to press an "email" button 210 and pre-populate an email with the current lot and summary inspection information (FIG. 10K).

Figure 11A:
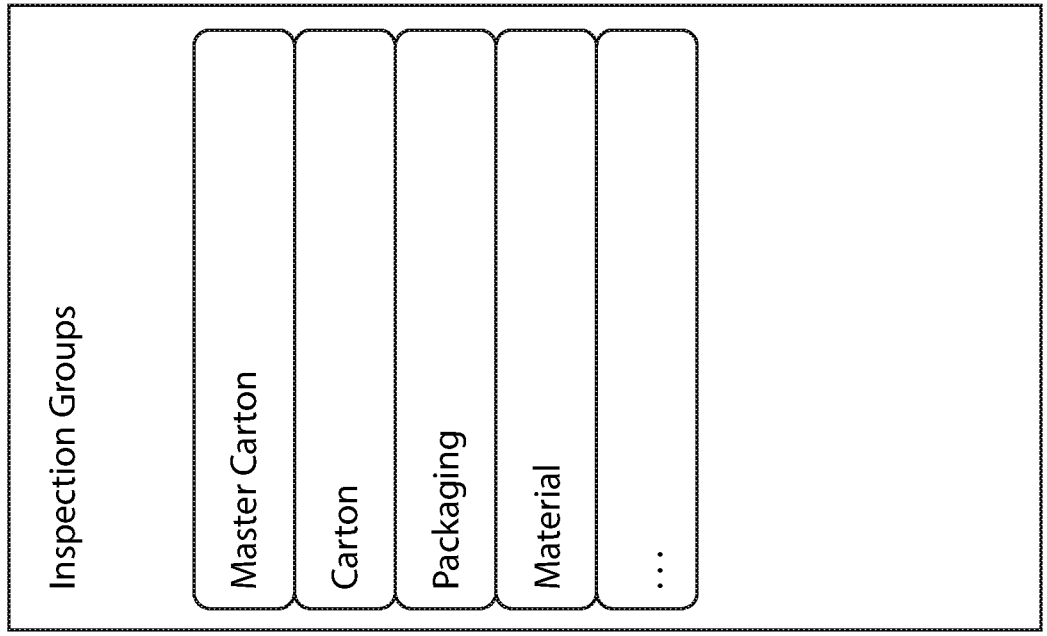
Figure 11B:
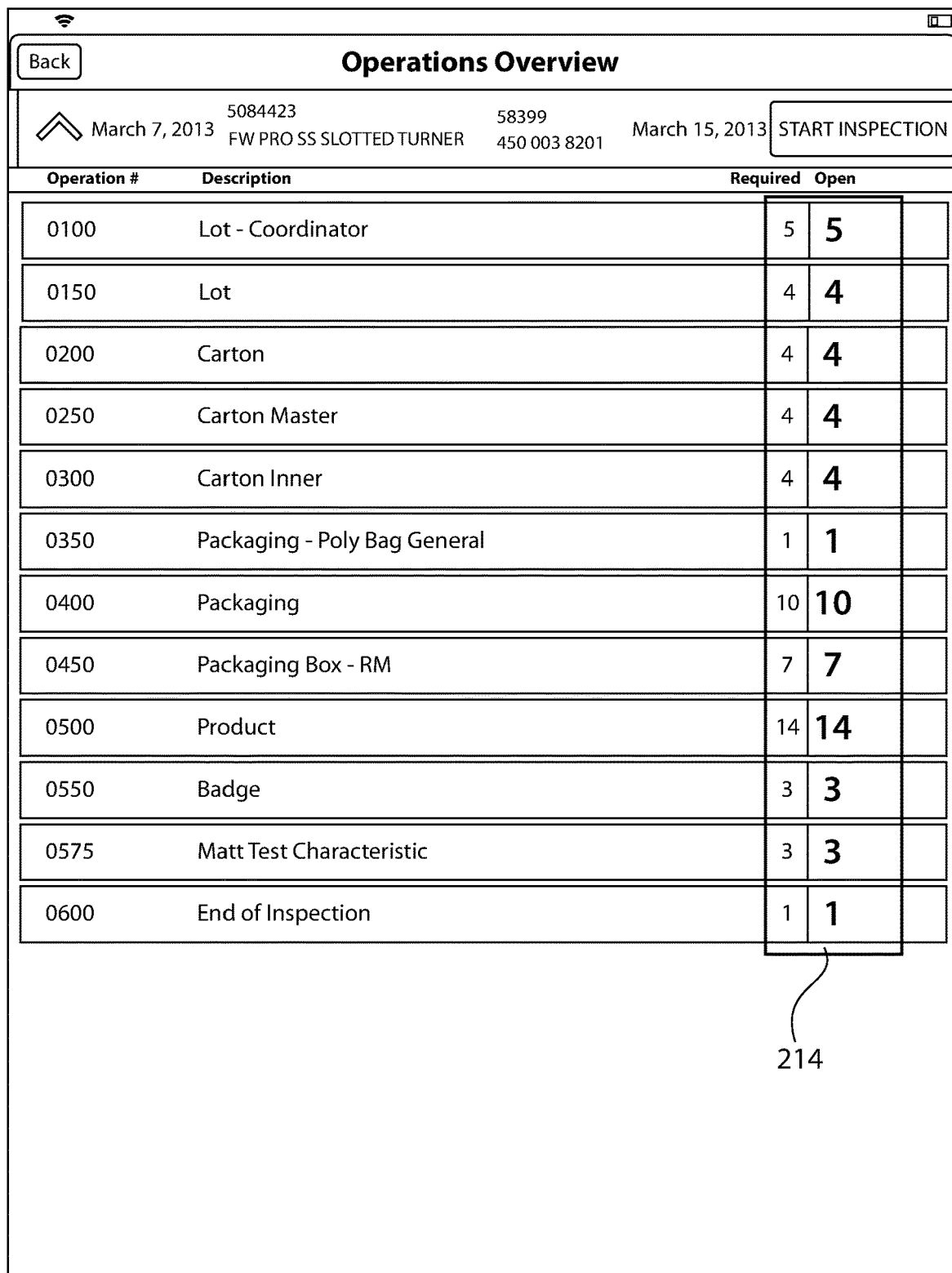

FIGS. 11A and 11B show the Inspection groups layer display according to an implementation. This layer serves as a grouping for inspection characteristics found in the inspection criteria layer 6 to be described below with respect to FIG. 12. When pulling data out the Sybase SAP database, there will be a group designation and the inspection group list will thus need to be populated. The inspection groups include things like master carton, carton, packaging, packaging materials, etc. As shown in FIG. 11B there is shown an operations overview which is the result of the selection of a lot from the worklist screen. Here, on the right side next to each of the inspection group items for the selected lot, two columns 214 are provided "required" and "open". This area of the display informs the user as to how many characteristics (or questions) remain open in the reference operation sets. This is a very helpful feature in providing the user with a real time indication of what is outstanding in order to complete the respective inspection.

An exemplary table is shown below for the inspection groups of layer 5.

TABLE II

TRANSFER

| Operation | # Char | Status | # char open |
|---|---|---|---|
| Lot | 6 | Complete | 4 |
| Carton | 5 | Complete | 3 |
| Master | 7 | Pending | 2 |
| Inner | 4 | Complete | 0 |
| Packaging | 4 | Open | |
| Product | 10 | Open | |

Here, the number of completed characteristics are summarized by operation. This way the user is provided with a simple way to see if there are any characteristics open. According to one implementation, the "Transfer" button is not enabled until all characteristics are complete.

FIG. 12 shows an example of the Inspection Criteria screen display, according to an implementation. The Inspection characteristics are listed in this layer, and each characteristic will drill in to a results recording layer with more detail and specific fields to be populated. This area is accessed by clicking on the desired inspection group in the "inspections group" screen (layer 5) shown and discussed with reference to FIG. 11. This inspection criteria part of the application is aware of conditional inspection characteristics and modifies the display accordingly. For example, a characteristic may only be visible if the previous characteristic is rejected or accepted. Each inspection characteristic item will drill in to the inspection characteristic detail for that group which is found in the results recording layer discussed below. The following table is an example of list of characteristics from a "Lot" operation where the status of each characteristic is provided, and the ability to add any number of defects exists.

TABLE III

| Characteristic | Status | # defects |
|---|---|---|
| Char 1 | Complete | 4 |
| Char 2 | Complete | 3 |
| Char 3 | Pending | |
| Char 4 | Complete | 0 |
| Char 5 | Open | |
| Char 6 | Open | |
| Char 7 | Open | |

FIGS. 13A-13J show examples of the results recording display or layer 7 according to an implementation of the present principles. This layer displays specific criteria, inspection methods and results fields to be populated. In addition, users will be able to log defects through this layer. This layer is accessed by clicking on a desired inspection criteria from the inspection criteria layer 6.

Examples of the type of information that can be recorded include, Inspection Operation, Char #, Characteristic Short Text, Characteristic Long Text, Tools required, Methods—links for (PDF, JPG, MOV), Specification (Pass-Fail/Major from lot), Sample Size (# inspector is to inspect from lot), Inspection Qty (Inspector enters # they inspected), Result recording (pull QAQEE-SUMPLUS), Result recording Long text (inspector to enter—will auto populate the short text to the # of char avail in short text when loading back to SAP, Assign origin result=06—From Mobile data recording, and SUBMIT or SAVE (If there is a failure—record defects required, if not, proceed to next characteristic). FIG. 22 depicts an example of some entries one might see on the results recording layer 7.

As noted, the number of units to test is listed, along with the result code, the tools required and the method. FIG. 13B shows three screens (136.1, 136.2, 136.3), where from the operations overview screen on the left, a user selects a Reference Operation Set, which then opens a list of characteristics for the user to record the results. Thus, when the user selects "results" on the characteristic inquiry "do all samples look the same and match the approved sample?" the "qualitative results recording" window would open and allow the user to input the details of the results.

Figure 13C:
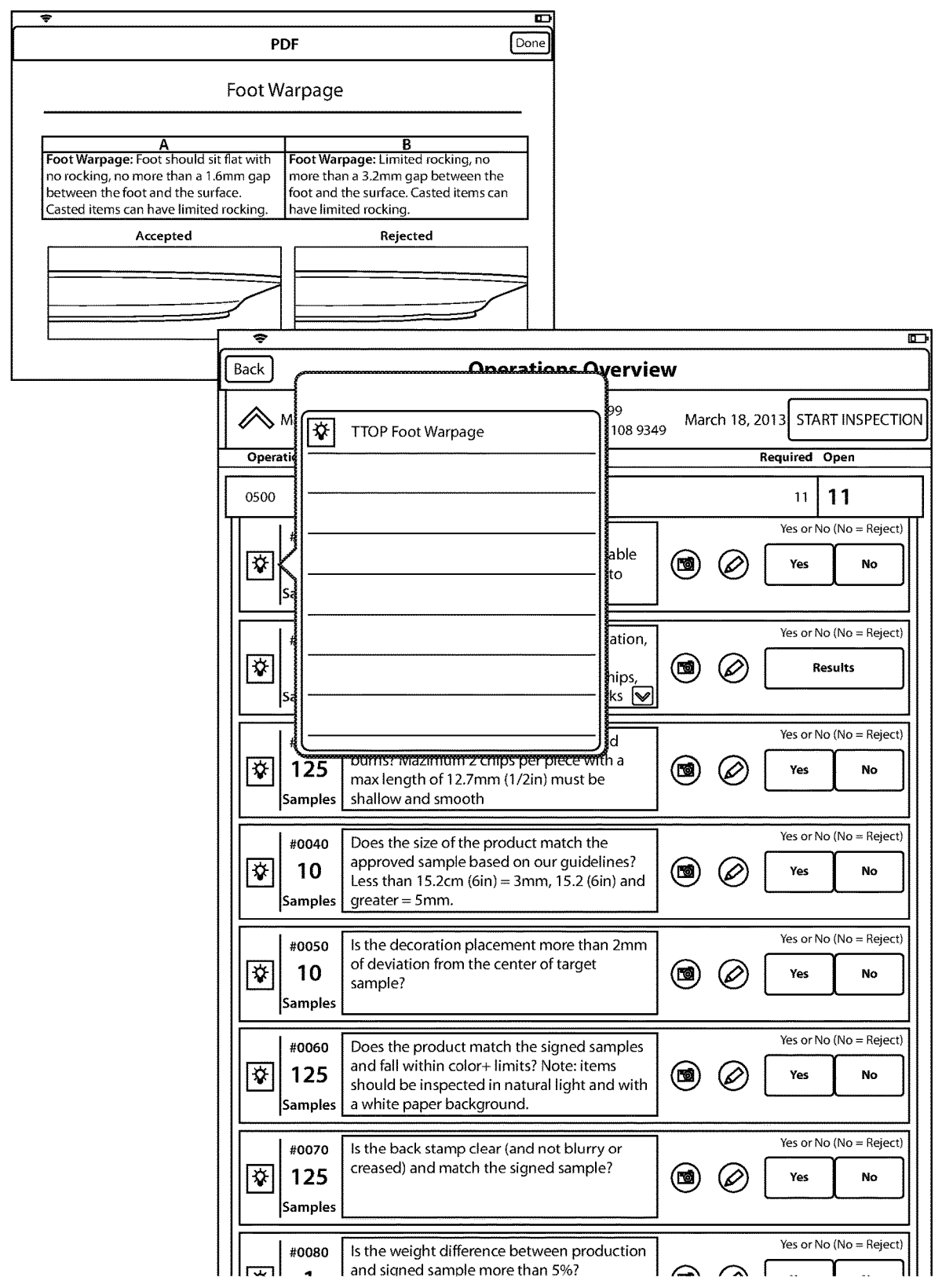

FIGS. 13C and 13D show other examples of the results recording screen layer 7. In accordance with one implementation, reference material for the user pertaining to a particular characteristic can be made available as an attachment. For example this may be a jpeg, pdf, video or any other type of attachment. More than one attachment is also viable. Each entry criteria includes a photo button 222 which allows the user to take pictures at the characteristic level. Each entry criteria will also include a note button 224 which allows the user to take notes at the characteristic level.

According to one preferred implementation, the application will not allow for characteristics to be locked once they are opened. FIGS. 13E-13G show examples of opening and locking characteristics in accordance with this implementation. Step 1, the user opens Reference operation set "Records Review" (FIG. 13E). Upon opening, the two (2) characteristics are locked. At step 2, the user records "no" on characteristic #0010, thus opening characteristic #0020, while #0030 remains locked (FIG. 13F). If the user changes the answer to "yes" for characteristic #0010, this opens characteristic #0030 and locks #0020 (FIG. 13G). This prevents the user from making errors or inadvertently recording a result for the wrong characteristic, but it also enables some dynamic changing of the recording of results without having to start over. Those of skill in the art will appreciate that if the user was recording directly in the source system, the user would have to cancel the lot and start from the beginning.

Figure 13I:

FIGS. 13H-13J show an example of the entry of quantitative characteristics using the results recoding layer 7. In step one, the user hits the "results" button (FIG. 13H). This action opens a quantitative results recording screen where the individual results are entered (FIG. 13I). Once completed, the user hits "record", and the application records the results and returns back to the source system of individual results (FIG. 13J).

As part of the inspection process users will need to log defects. This will be handled in defect recordings section (layer 8) of the application and will include defect type, description, defect location, etc. In addition, users will have the ability to save multiple pictures of the defect. This section is accessed by clicking on the desired inspection criterion from layer 6. Generally speaking, when a user records a negative answer for a characteristic, the defect recordings screen is automatically brought up where they can record the defects.

FIG. 14A shows an example of the defect recordings screen and the data to be included therein. All non-conformance issues will be logged here. The results will go back to the SAP Sybase database when the inspection is complete. There may be a "defect code" that needs to be populated. The # of defects, the location and details of the same are all to be logged/recorded in this section. One or more pictures may be taken of the defect using the picture button. Once completed, the user hits "submit" to record the defect (i.e., send to the SAP Sybase database). In addition to pictures, it is contemplated to enable the taking of video of defects as well, e.g., non-functioning can opener).

Figure 14B:
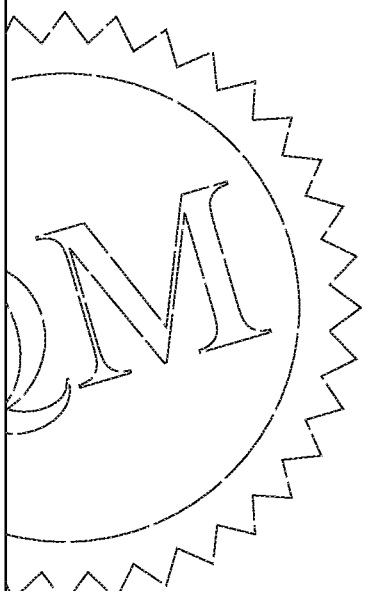
Figure 14C:
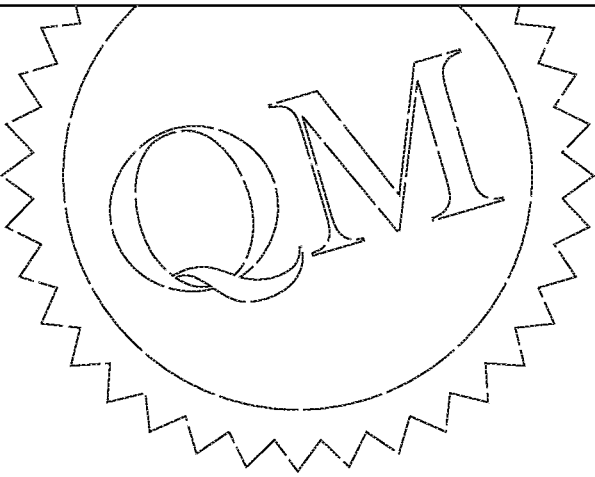
Figure 14D:
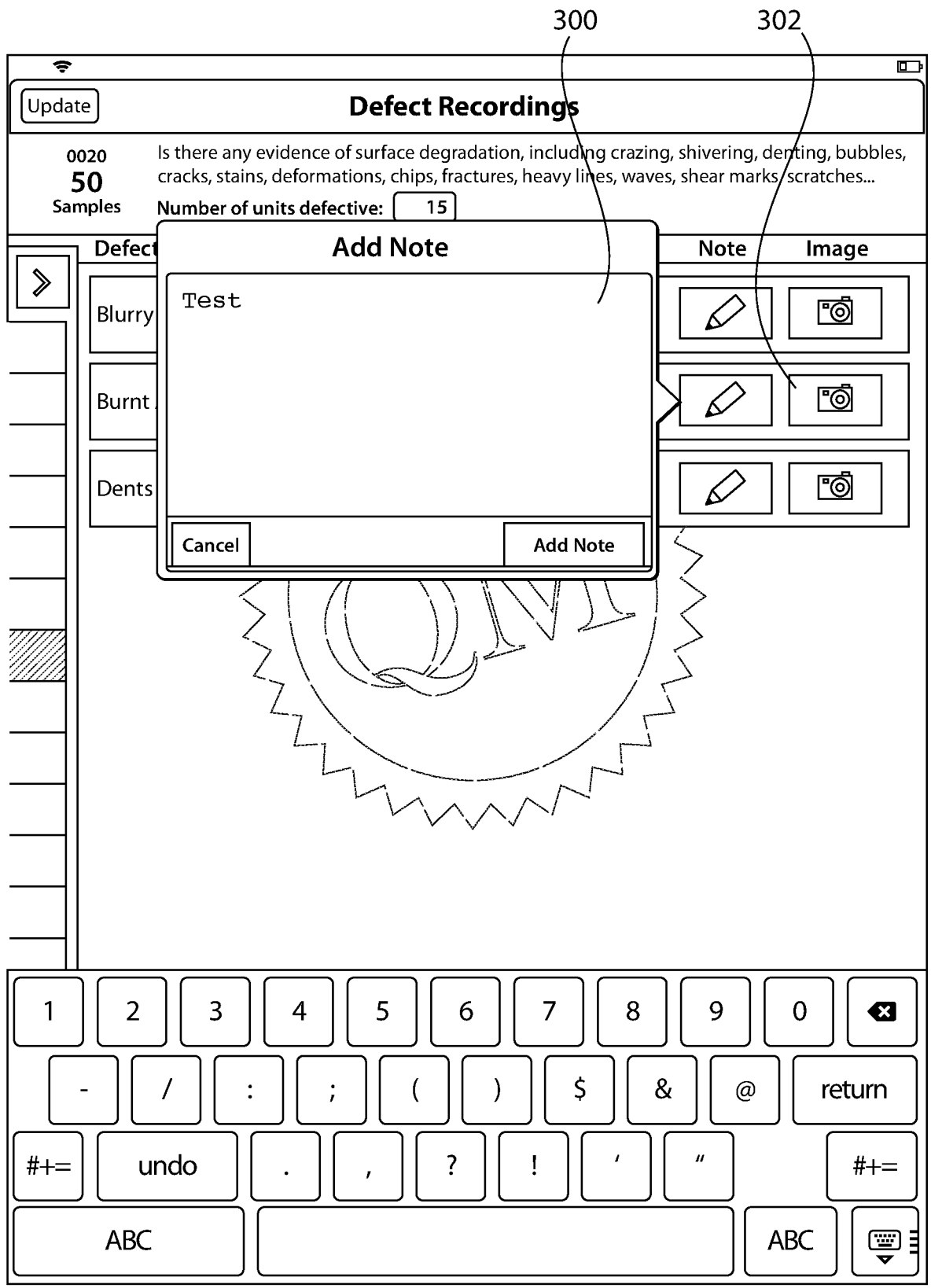

FIGS. 14B-14D show examples of this defect recording process. At step 1, the user opens or selects one or many defects. Here, the same defect can be selected more than once (FIG. 14B). The user may then select the location, enter the number of non-conforming units and the number of defects per defect (FIG. 14C). As mentioned above, the user has the option of adding pictures or notes for each defect recorded (FIG. 14D) by pressing either the notes 300 or picture 302 buttons.

Figure 14E:
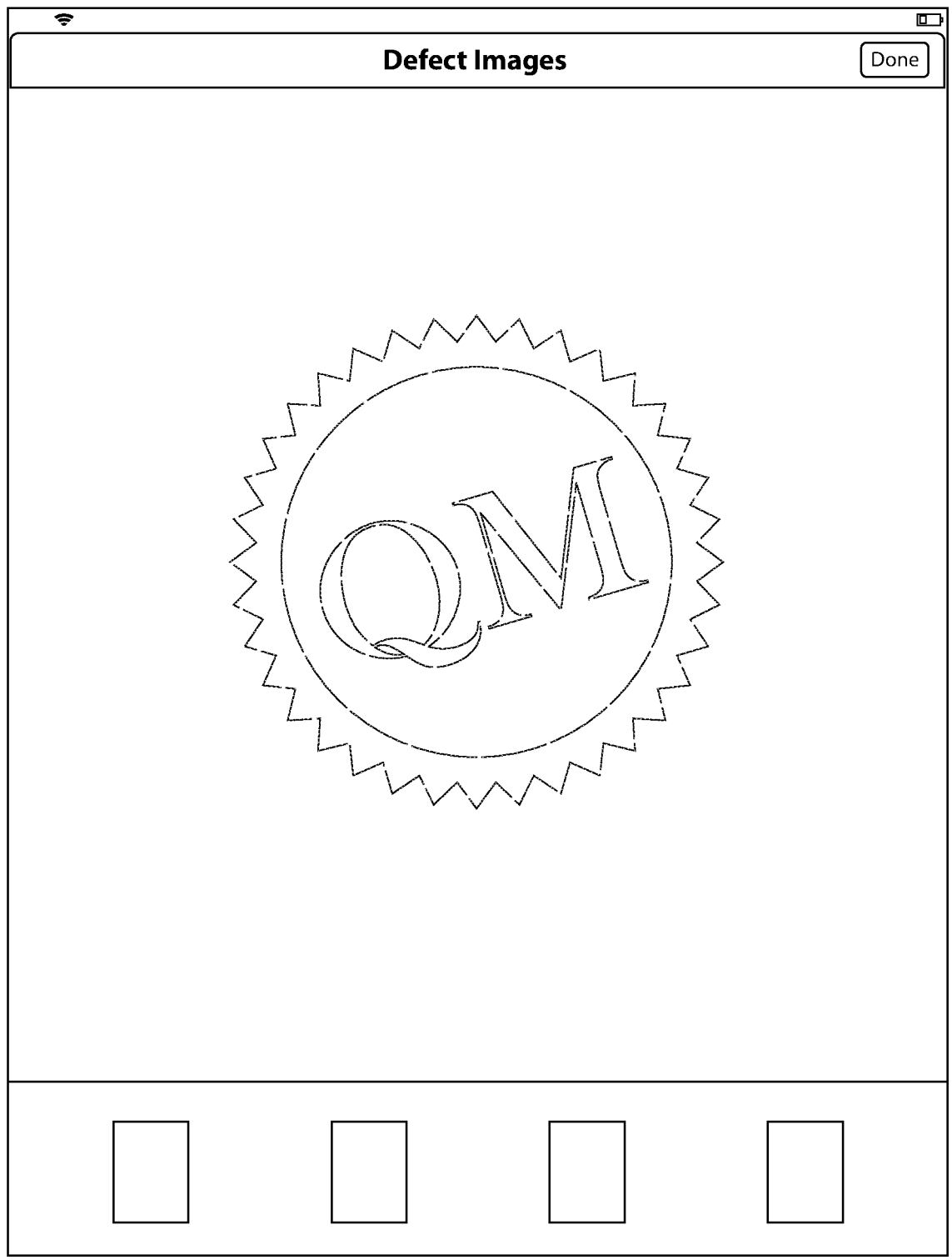
Figure 14F:
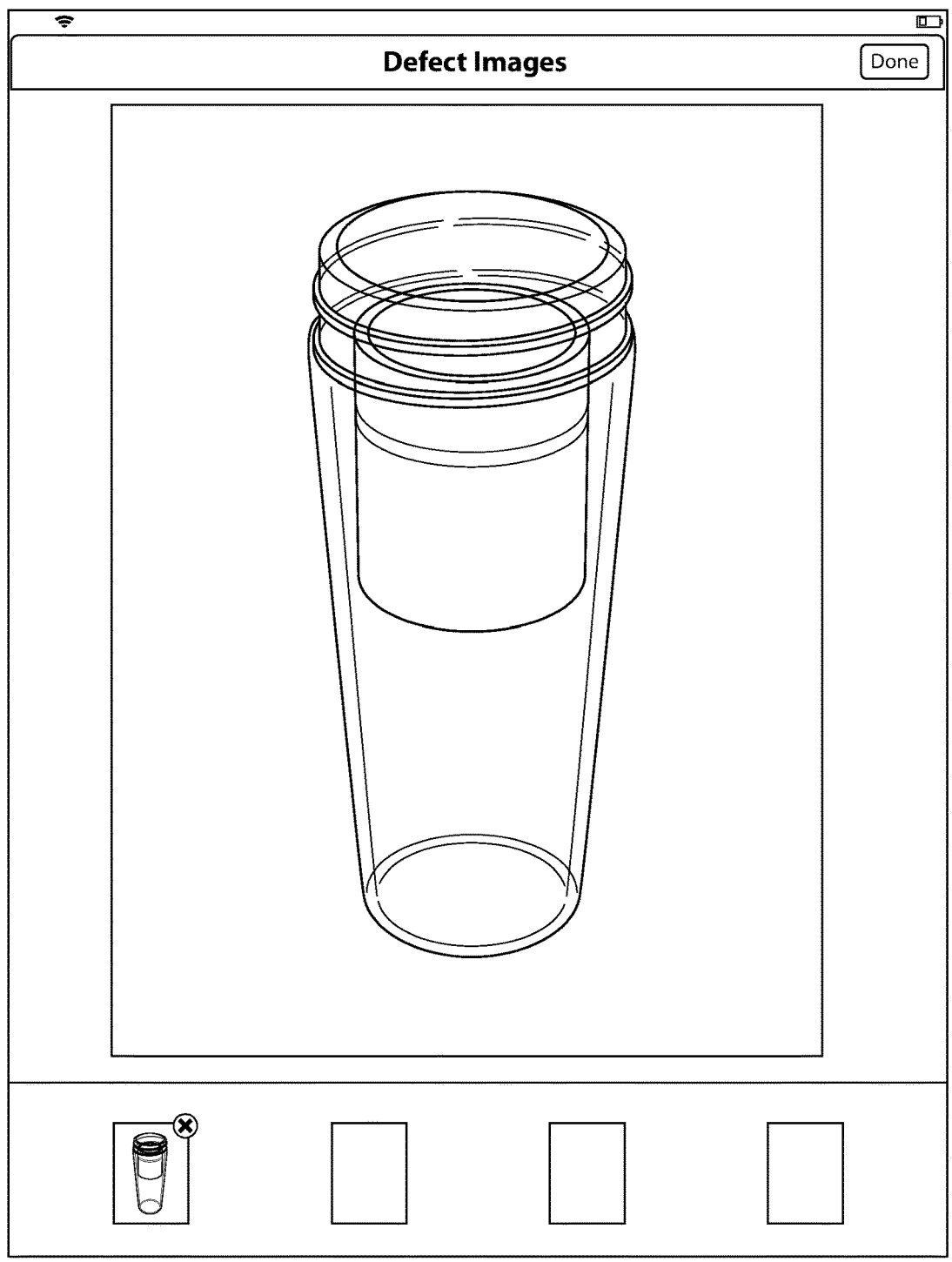

FIGS. 14E and 14F show example displays for the pictures of defects logged or to be added. The QM application management system of the present principles can be programmed to accommodate as many images as desired. In the present example, 4 defect images can be taken and loaded into the inspection record.

FIG. 15 shows an exemplary layout of a previous notifications screen (layer 9). Occasionally users will want to know what defects have been logged for the materials in their work list. As such, this data will need to be pulled and available in the quality management application of the present invention. This previous defect information will be refreshed every time there is a new material added to the work list, and will include all previous defects sorted by the factory. It is contemplated herein that this layer will be accessible from a link provided on layer 1, the main menu of the QM application.

From the previous notifications screen (layer 9), a user can select an individual defect. This will transition them to the notification detail screen (layer 10) shown in FIG. 16, where they will see previous defect details including material number, description defect status, defect code, and a defect description or detail.

FIG. 17 shows an example of the Inspection procedures display screen. This is where the inspection procedures will be provided. This will be a full download when the QM application is initially provisioned. In the background, this will serve as the data store for inspection details found in layer 7. When accessed via the main menu of layer 1, it will serve as a searchable database of material specific procedures.

FIG. 18 shows an example of the procedure detail screen (layer 12) according to an implementation. This is where specific inspection details will be provided, beyond that provided in the general inspection procedures screen. Any and all specific inspection details may be provided on this screen. The inspection procedure display screens of layers 11 (FIG. 17) and 12 (FIG. 18) enable the QM management system to provide inspection instructions to new or less experienced inspectors, and lessens the amount of time necessary to train such inspectors at these procedures.

Figure 20:
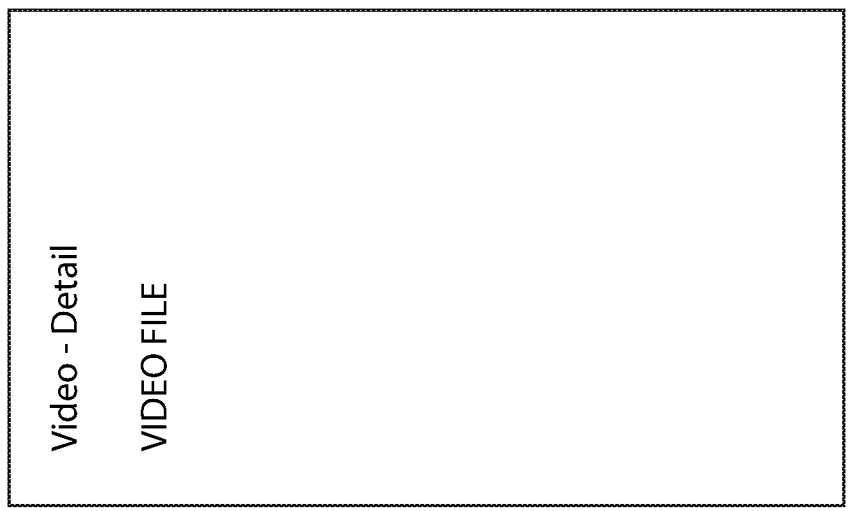
Figure 19:
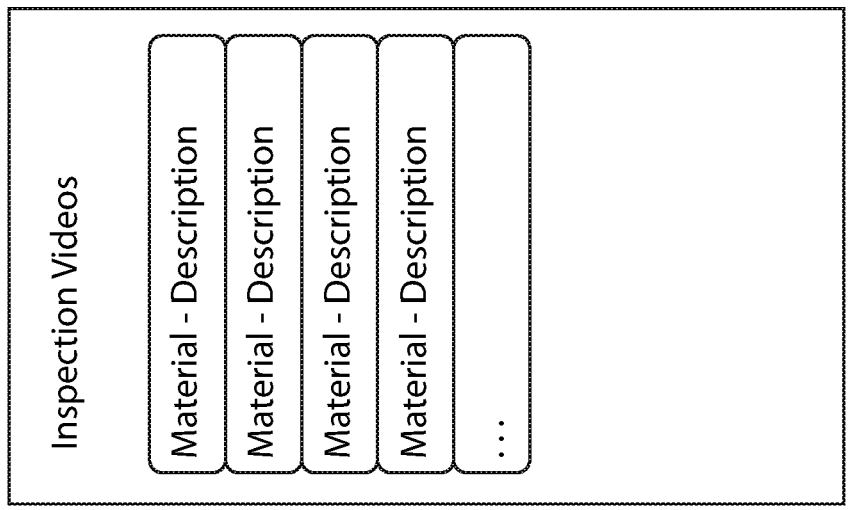

According to a further implementation, layer 13 of the QM Management system is where inspection video demonstrations can be provided (FIG. 19). All videos would be downloaded once the QM management application is provisioned and will allow the inspector to view inspection videos and requirements by material. The video details (e.g., the video file) would be provided in another layer 14 (FIG. 20).

Figure 21:
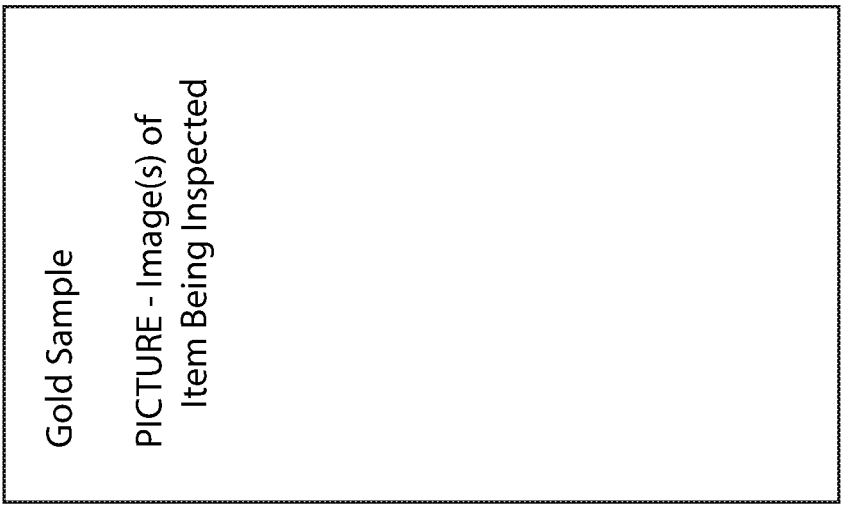

FIG. 21 shows another layer (layer 15) where the Gold Sample would be provided. For each material being inspection, there should be a gold sample on the system for comparison purposes. This gold sample can have one or more pictures of the item being inspected and is configured to be the only information what would occupy region D in the application.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

What is claimed is:

1. A mobile Quality Management Inspection System comprising:
   a mobile device in communication with at least one network server, the mobile device having a display screen and input means for inputting data, said data including photographs; and
   a database in communication with the network server and configured to receive and store all data input to the mobile device during an onsite inspection, the network server configured to perform, according to the data input to the mobile device, a usage decision process and a non-conformance process, the usage decision process includes the network server automatically performing the steps of:
      determining whether a sample in an inspection lot meets a gold seal acceptance standard;
      updating a quality information record if the sample meets the gold seal acceptable standard;
      determining whether a source inspection is rejected with re-inspection;
      generating an indication to block the inbound delivery of the rejected source inspection;
      identifying a failure of the inspection lot; and
      creating a new inspection when there has been an identified failure in the inspection;
   wherein the mobile device is configured to enable an inspector to perform, on site, at least one selected from a group consisting of source inspection, receiving inspection, product qualification inspection, social compliance, Customs-Trade Partnership Against Terrorism (CTPAT) and factory valuations, non-conformance processing, and document management, and
   wherein the mobile device is further configured to upload this the non-conformance process results and any one of the on site inspector selected processes to the database in real time.

2. The system according to claim 1, wherein the network server is further configured for:
   creating the inspection lot in response to a vendor's completion of an order;
   recording inspection results using the mobile device;
   performing the usage decision process on accepted inspection lots, the accepted inspection lots having no identified defects; and
   performing the non-conformance process on unaccepted inspections lots, the unaccepted inspection lots having at least one defect.

3. The system of claim 2, wherein said recording further comprises:
   performing an on-site quality control product inspection of one or more lots of products at a factory manufacturing the same; and
   recording such inspection results in real time.

4. The system of claim 2, wherein said performing a non-conformance process further comprises:
   selecting a quality notification from a list of quality notifications;
   adding tasks associated with the selected quality notification;
   assigning users to each added task;
   receiving notifications from the assigned users as to the completion of each assigned task;
   recording a usage decision based on the completion of tasks, said recording closing the inspection lot; and
   determining whether to close quality notification relating to the inspection lot.

5. The system of claim 2, wherein the creation of the inspection lot further comprises:
   opening a window on the mobile device to record characteristic results;
   determining whether any defects are found in the inspection lot;
   recording any defects found in the inspection lot;
   for each product where no defects are found, saving the inspection lot;
   calculating the number of recorded defects in the inspection lot;
   comparing the calculated number of recorded defects with a predetermined value; and
   determining whether or not to accept the inspection lot.

6. The system of claim 5, wherein the determining comprises:
   creating a quality notification and assigning a coordinator when it is determined not to accept the inspection lot; and
   completing an acceptance of a usage decision process when it is determined to accept the inspection lot.

7. The system of claim 5, wherein after the comparing the creation of the inspection lot further comprises sending an electronic communication to a vendor responsible for the inspection lot providing the comparison results.

* * * * *